(12) United States Patent
Bryant

(10) Patent No.: US 8,556,537 B2
(45) Date of Patent: Oct. 15, 2013

(54) MANGANESE-MEDIATED REDOX PROCESSES FOR ENVIRONMENTAL CONTAMINANT REMEDIATION

(75) Inventor: James Daniel Bryant, Wall, NJ (US)

(73) Assignee: Geo-Cleanse International, Inc., Matawan, NJ (US)

( * ) Notice: Subject to any disclaimer, the term of this patent is extended or adjusted under 35 U.S.C. 154(b) by 402 days.

(21) Appl. No.: 12/711,940

(22) Filed: Feb. 24, 2010

(65) Prior Publication Data

US 2010/0215437 A1 Aug. 26, 2010

Related U.S. Application Data

(60) Provisional application No. 61/154,815, filed on Feb. 24, 2009.

(51) Int. Cl.
*B09C 1/00* (2006.01)

(52) U.S. Cl.
USPC .................................................. 405/128.75

(58) Field of Classification Search
USPC .......................................... 405/128.1, 128.75
See application file for complete search history.

(56) References Cited

U.S. PATENT DOCUMENTS

| | | | |
|---|---|---|---|
| 4,591,443 A | 5/1986 | Brown et al. | |
| 5,264,018 A | 11/1993 | Koeningsberg et al. | |
| 5,286,141 A | 2/1994 | Vigneri | |
| 5,520,483 A | 5/1996 | Vigneri | |
| 5,525,008 A | 6/1996 | Wilson | |
| 5,741,427 A | 4/1998 | Watts et al. | |
| 5,967,230 A | 10/1999 | Cooper et al. | |
| 6,019,548 A | 2/2000 | Hoag et al. | |
| 6,274,048 B1 | 8/2001 | Parker et al. | |
| 6,315,494 B1 | 11/2001 | Oberle | |
| 6,623,211 B2 * | 9/2003 | Kukor et al. | 405/128.75 |
| 6,843,618 B2 * | 1/2005 | Lundy | 210/747.8 |
| 6,869,535 B2 | 3/2005 | Cowdery et al. | |
| 7,175,770 B2 | 2/2007 | Whisman | |
| 2004/0197150 A1 | 10/2004 | Bruell et al. | |
| 2005/0258110 A1 | 11/2005 | Block et al. | |
| 2006/0016766 A1 * | 1/2006 | Kerfoot | 210/760 |
| 2007/0189855 A1 | 8/2007 | Sethi et al. | |
| 2007/0280785 A1 | 12/2007 | Block et al. | |

OTHER PUBLICATIONS

International Search Report/Written Opinion for PCT/US2010/025229, completed Jun. 14, 2010.
MacDonald, Jacqueline, A., et al., "Restoring Contaminated Groundwater: An Achievable Goal?", 1994, Environ. Sci. Technol., vol. 28, No. 8, pp. 362-368.
Perez-Benito, J.F., et al., "Occurrence of Colloidal Manganese Dioxide in Permanganate Reactions", 1992, Journal of Colloid and Interface Science, vol. 152, pp. 70-84.
Siegrist, Robert L., et al., "In Situ Chemical Oxidation by Fracture Emplaced Chemical Solids", May 1999, J. Env. Engineering, pp. 429-440.
Smith, B.A., et al., "Mechanism for the Destruction of Carbon Tetrachloride and Chloroform DNAPLs by Modified Fenton's Reagent", 2006, Journal of Contaminant Hydrology, vol. 85, pp. 229-246.
Watts, R.J., et al., "Role of Reductants in the Enhanced Desorption and Transformation of Chloroaliphatic Compounds by Modified Renton's Reactions", 1999, Environmental Science & Technology, vol. 33, pp. 3432-3437.
Watts, R.J., et al., "Destruction of a Carbon Tetrachloride Dense Nonaqueous Phase Liquid by Modified Fenton's Reagent", 2005, Journal of Environmental Engineering, vol. 131, pp. 1114-1119.

\* cited by examiner

*Primary Examiner* — John Kreck
(74) *Attorney, Agent, or Firm* — Barnes & Thornburg LLP

(57) ABSTRACT

Methods and compositions for the remediation of environmental contaminants using redox reactions are described. The redox reactions include manganese compounds and peroxide generating compounds. The methods and compositions are also useful for the remediation of highly oxidized environmental contaminants.

22 Claims, 10 Drawing Sheets

MANGANESE-MEDIATED REDOX PROCESSES FOR ENVIRONMENTAL CONTAMINANT REMEDIATION

CROSS REFERENCE TO RELATED APPLICATIONS

This application claims priority under 35 U.S.C. §119(e) to U.S. Provisional Application Ser. No. 61/154,815, filed on Feb. 24, 2009, the entire disclosure of which is expressly incorporated herein by reference.

FIELD OF THE INVENTION

The invention described herein pertains generally to remediation of environmental contaminants. More particularly, the invention described herein pertains to remediation of environmental contaminants that include highly oxidized compounds using manganese-mediated redox processes.

BACKGROUND AND SUMMARY OF THE INVENTION

Following a long period of environmental neglect, the United States and other countries have placed a high priority on remediation of contaminated sites. It is estimated that between 300,000 and 400,000 contaminated sites are scheduled for cleanup in the United States in the coming decades, at an estimated cost as high as $500 billion to $1 trillion (National Research Council, "Alternatives for Ground Water Cleanup, Washington, D.C.: National Academy Press, 1994; M. Russell et al., Hazardous Waste Remediation: The Task Ahead, Knoxville: University of Tennessee, 1991). The foregoing publication, and each additional publication cited herein, is incorporated herein by reference. U.S. spending on waste site remediation totaled approximately $9 billion in 1996 alone.

Despite this considerable investment, conventional technologies for remediation of contaminated sites, especially those with contaminated ground water, are inadequate. For example, the National Research Council (NRC) has conducted a study of conventional ground water cleanup systems at 77 contaminated sites and determined that ground water cleanup goals had been achieved at only 8 of the sites and that full achievement was highly unlikely with the in-place technologies at 34 of the 77 sites (NRC, ibid., 1994; MacDonald and Kavanaugh, Envir. Sci. Tech. 28(8), 362A-68A, 1994). Based on these findings, it is believed that improved technologies are needed to restore contaminated sites.

The most common types of contaminants found at waste sites include chlorinated solvents, petroleum hydrocarbons, and metals (NRC, 1994). Chlorinated solvents, such as carbon tetrachloride, trichloroethylene, and perchloroethylene, are used for such purposes as dry cleaning and degreasing industrial manufacturing equipment and cleaning military aircraft. Petroleum hydrocarbons commonly found in soil and ground water include components of gasoline, such as benzene, toluene, ethylbenzene, and xylene (also referred to as BTEX). Other common contaminants of soil and ground water include naphthalene, chlorinated solvents, and polycyclic aromatic hydrocarbons (PAHs), such as benzopyrenes, created from combustion, coal coking, petroleum refining, and wood-treating operations; nitroaromatic compounds such as trinitrotoluene utilized in production of explosives; inorganic compounds such as metals and cyanides; and polychlorinated biphenyls (PCBs), once widely used in electrical transformers and capacitors and for a variety of other industrial purposes. Because of the widespread use of these and other industrial chemicals, contaminated soil and ground water has been found in many sites around the world.

During the 1990s, as the limitations of conventional subsurface remedial technologies had become increasingly clear, new technologies emerged to restore contaminated soil and ground water. Some of those newer technologies used on contaminated soil and ground water at U.S. Superfund sites include air sparging, bioremediation, passive treatment wall, dual-phase extraction, in situ well aeration, in situ oxidation, and pump and treat methods. However, air sparging, dual-phase extraction, pump and treat methods, passive treatment wall, and in situ well aeration technologies each include high equipment and labor costs with mechanical treatment of ground water. In contrast, bioremediation and intrinsic remediation have exhibited a long-term approach but are still being optimized and have yet to be proven as generally effective, primarily owing to concerns associated with providing an environment optimal for multiplication of the microbes while consuming the contaminant(s).

One of the more conventional technologies for remediation of contaminated ground water is based on the principle that if enough water is pumped from the site, the contaminants will eventually be flushed out. In such "pump and treat" methods, the pumped-out water is treated ex situ to remove contamination, which has limited effectiveness, especially for remediation of undissolved sources of contamination beneath the water table. In addition, several key contaminant and subsurface properties may interfere with flushing include: solubility of contaminants into water; diffusion of contaminant into micropores and zones with limited water mobility; absorption of contaminants to subsurface materials; and heterogeneity of the subsurface. Because of the difficulty of flushing contaminants from the subsurface, the NRC concluded in its 1994 study that pump and treat methods would likely be unable to fully restore many types of contaminated sites.

Other systems are known for oxidizing hydrocarbons to less harmful chemical constituents in situ, both in soil and in ground water. One such oxidizing agent known for such a use is hydrogen peroxide. For example, in the Fenton reaction, hydrogen peroxide can be mixed with a metallic salt such as ferrous sulfate to produce a hydroxyl free radical:

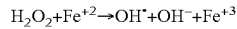

$$H_2O_2 + Fe^{+2} \rightarrow OH^{\cdot} + OH^- + Fe^{+3}$$

where $H_2O_2$ is hydrogen peroxide, $Fe^{+2}$ is ferrous iron, $OH^{\cdot}$ is hydroxyl free radical, $OH^-$ is hydroxyl ion, and $Fe^{+3}$ is ferric iron. The hydroxyl radical is capable of breaking bonds in certain organic molecules in an exothermic reaction to produce products, including carbon dioxide, water, and other less-hazardous compounds. Particular in situ systems utilizing Fenton-type reactions have been disclosed by Brown (U.S. Pat. No. 4,591,443) and Wilson (U.S. Pat. No. 5,525,008), both of which include mixing the Fenton reactants prior to introduction into the soil and ground water. Vigneri (U.S. Pat. Nos. 5,286,141 and 5,520,483) has described a remediation method and system that includes a pre-acidification of the ground water prior to a sequential introduction of the Fenton reactants, wherein hydrogen peroxide is added after an injection of ferrous sulfate at a high concentration. Yet other Fenton-type systems have been disclosed by Watts et al. (U.S. Pat. No. 5,741,427), Cooper et al. (U.S. Pat. No. 5,967,230), and Whisman, III (U.S. Pat. No. 7,175,770). Such Fenton-based systems are capable of oxidizing a wide range of organic contaminants. The foregoing publications, and each of the subsequent publications cited herein are incorporated herein by reference.

Fenton's reagent chemistry is complex, involving a number of additional reactions producing both oxidants and reductants that contribute to contaminant destruction:

$$OH^{\cdot}+Fe^{+2} \rightarrow OH^{-}+Fe^{+3}$$

$$Fe^{+3}+H_2O_2 \rightarrow H^{+}HO_2^{\cdot}+Fe^{+2}$$

$$Fe^{+2}+HO_2^{\cdot} \rightarrow Fe^{+3}+HO_2^{-}$$

$$Fe^{+3}+HO_2^{\cdot} \rightarrow Fe^{+2}+O_2+H^{+}$$

$$OH^{\cdot}+H_2O_2 \rightarrow H_2O+H^{+}+O_2^{\cdot-}$$

where $HO_2^{\cdot}$ is hydroperoxyl radical (a weak oxidant), $HO_2^{-}$ is hydroperoxyl anion (a reductant), $O_2$ is molecular oxygen, $O_2^{\cdot-}$ is superoxide radical (a reductant), $HO_2^{-}$ is hydronium ion, and $H_2O$ is water. The suite of reactions associated with the Fenton reaction is generally considered an oxidative system, and hydroxyl radical production is the predominant reaction. Though reductants such as hydroperoxyl anion and superoxide radical may be produced, it has been reported that the amount produced is too low, and the duration over which production occurs is too short to be practically useful.

Another oxidizing agent known to produce oxidizing radicals includes the catalyzation of persulfate ion ($S_2O_8^{-2}$), which produces sulfate radicals ($SO_4^{\cdot-}$) and hydroxyl radicals:

$$S_2O_8^{-2}+Fe^{+2} \rightarrow SO_4^{\cdot-}+SO_4^{-2}+Fe^{+3}$$

$$SO_4^{\cdot-}+OH^{-} \rightarrow OH^{\cdot}+SO_4^{-2}$$

Particular systems utilizing persulfate-type reactions for in-situ soil and groundwater remediation have been disclosed by Hoag (U.S. Pat. No. 6,019,548), Bruell (U.S. Pat. Appl. No. 2004/0197150), and Block et al. (U.S. Pat. Appl. Nos. 2005/0258110, 2007/0189855, and 2007/0280785). It has been reported that sodium persulfate can also be catalyzed by high pH (>10.5), high concentrations of transition metals such as iron (>150 mg/L), and heat (at acidic or near-neutral pH).

Without being bound by theory, it is believed herein that some sites with certain geological characteristics may consume remediation reactants, such as high-carbonate soils containing high concentrations of limestone or shells, and can act as a buffer by raising the pH of the treating components of conventional systems and reduce their efficacy. In addition, dissolved bicarbonate in alkaline, i.e. hard groundwater, may also act as a radical scavenger, and reduce the efficacy of the treating components of conventional systems.

Yet another oxidizing agent for such use in remediation is permanganate ion ($MnO_4^{-}$). Permanganate, which may be provided as one or more soluble ionic salts, can be mixed with soil and ground water in-situ, and is also capable of breaking bonds by direct reaction with certain organic compounds, primarily unsaturated aliphatic compounds such as trichloroethylene ($C_2HCl_3$), as illustrated in the following reaction:

$$2MnO_4^{-}+C_2HCl_3 \rightarrow 2MnO_2(s)+2CO_2+3Cl^{-}H^{+}$$

Particular systems utilizing permanganate-type reactions for in-situ soil and groundwater remediation have been disclosed by Parker et al. (U.S. Pat. No. 6,274,048), Oberle (U.S. Pat. No. 6,315,494), and Cowdery et al. (U.S. Pat. No. 6,869,535).

However, many common environmental contaminants are resistant to chemical oxidation, and instead are more readily destroyed in-situ by chemical reduction. Examples of such contaminants include chloromethanes, such as carbon tetrachloride, chloroform, and methylene chloride; nitrobenzenes; Freons™; PCBs; acetone; and oxidized metals such as hexavalent chromium. Methods are known to produce reductants, such as superoxide radical ($O_2^{\cdot-}$), but such methods are either enzymatic methods, or require aprotic solvents which themselves are often considered environmental contaminants. Further, it has been reported that such methods have limited utility in environmental remediation. Although it is known that Fenton-type and persulfate-type in-situ chemical oxidation systems may also produce small amounts of chemical reductants, such as superoxide radical, the amounts produced have been reported to be insufficient for use in remediation processes. In addition, the superoxide production has been reported to be short-lived and is rapidly terminated.

Accordingly, processes that are capable of generating higher levels of reducing agents, and generating such reducing agents over longer periods of time are needed. Further, such processes are desirably non-enzymatic and/or do not require the concomitant use of aprotic solvents to increase the amount of reducing agents that are generated or the period over which they are generated.

It has been surprisingly discovered that reductants may be generated in higher amounts, and over longer periods of time, in processes that include reacting Mn(IV) with a peroxide, where the reaction is stabilized by addition of either a buffer or compound capable of forming a ligand with manganese, or both.

In one illustrative embodiment of the invention, processes are described herein for decreasing the concentration of contaminants at or in a site by contacting the site with (a) Mn(IV) or a compound capable of generating Mn(IV); (b) a buffered aqueous solution, such as for example a buffered aqueous solution having a pH in the range from about 6 to about 10, or from about 6.5 to about 8, or near neutrality, and the like; and (c) a peroxide, or a compound capable of generating a peroxide. In one variation, the buffered aqueous solution further comprises one or more ligands of a manganese ion and/or one or more compounds capable of forming a ligand with a manganese ion. Such processes may be used to decrease the concentration of a wide variety of contaminants, including highly oxidized carbon contaminants, nitrogen containing contaminants, oxidized metals, other organic and inorganic contaminants, and the like.

In another illustrative embodiment, processes are described herein for decreasing the concentration of contaminants at or in a site by contacting the site with (a) Mn(IV) or a compound capable of generating Mn(IV); (b) one or more ligands of a manganese ion and/or one or more compounds capable of forming a ligand with a manganese ion; and (c) a peroxide, or a compound capable of generating a peroxide. In one variation, the ligands of the manganese ion and/or the compounds capable of forming the ligand with the manganese ion are included in a buffered aqueous solution having a pH in the range from about 6 to about 10, from about 6.5 to about 8, or near neutrality, and the like. Such processes may be used to decrease the concentration of a wide variety of contaminants, including highly oxidized carbon contaminants, nitrogen containing contaminants, oxidized metals, other organic and inorganic contaminants, and the like.

In another embodiment of the processes described herein, at least one of the compounds capable of forming a ligand with manganese is phosphate. In another embodiment of the processes described herein, the buffer comprises phosphate.

It is to be understood that in each of the processes described herein, the source of Mn(IV) may arise from a compound that includes manganese at an oxidation state of (IV), or alternatively manganese at a different oxidation state that is capable of generating Mn(IV) during the performance of the process. For example, it is appreciated that Mn(II) and Mn(III) may oxidize to Mn(IV) under ambient conditions when exposed to oxygen, or other compounds already present at the site, whether contaminants or naturally occurring compounds. It is further appreciated that Mn(VII), such as permanganate, may reduce to Mn(IV) under ambient conditions when exposed to certain transition metals, and/or organic compounds, including contaminants and/or naturally occurring compounds, that are subsequently oxidized.

DETAILED DESCRIPTION

Figure 1:
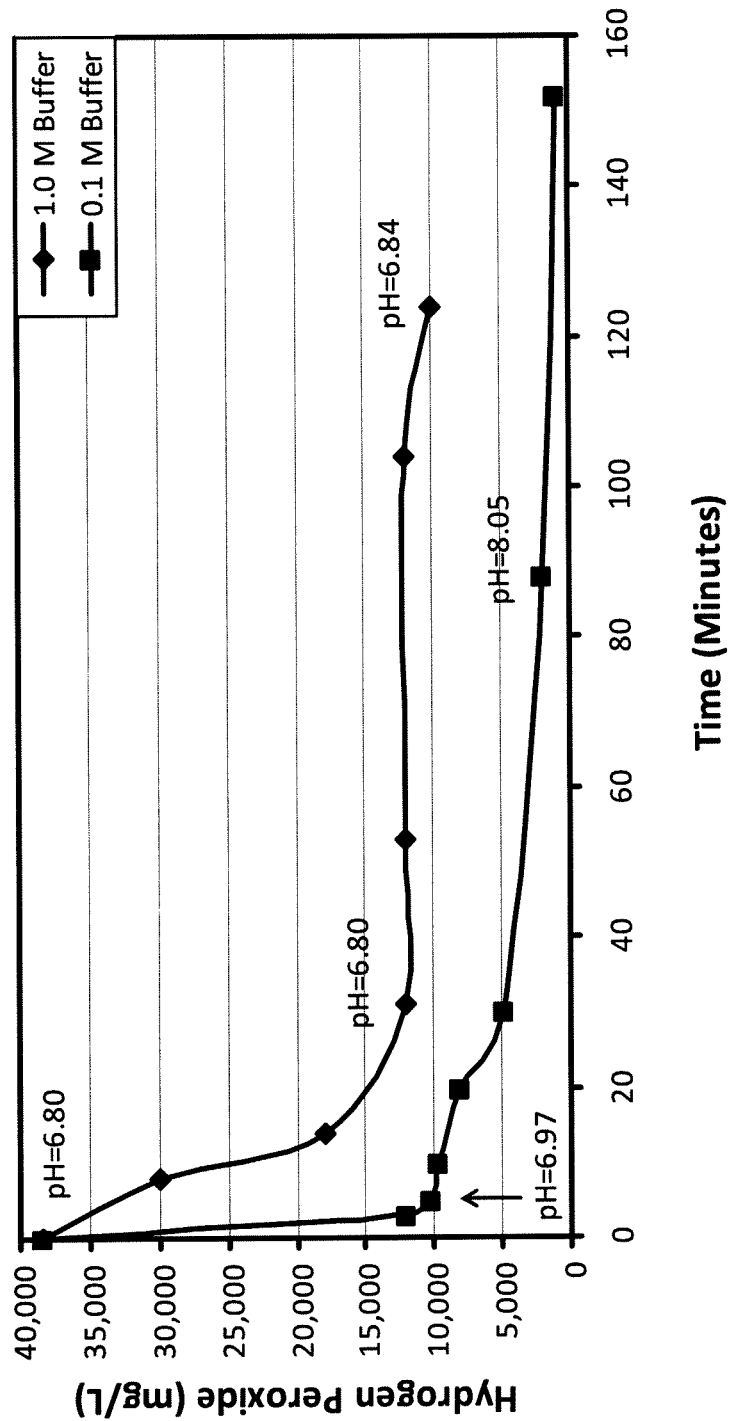
FIG. 1. shows phosphate buffer stabilization.

It has been reported that addition of peroxides in conjunction with manganese, or even after a time delay, is undesirable due to the vigorous reaction that may result. However, it has been discovered that the reaction of manganese compounds and peroxides can be stabilized, modulated, and/or regulated to achieve rates of reaction that are consistent with remediation processes. It has also been discovered herein that buffering the pH modulates, and may stabilize, the reaction rates of manganese compounds and peroxides. Accordingly, in one embodiment, the reaction of a manganese compound and a peroxide may be modulated by addition of a buffer. It has also been discovered herein that including a compound that is or may form a ligand of a manganese ion modulates, and may stabilize, the reaction rates of manganese compounds and peroxides. Accordingly, in another embodiment, the reaction of a manganese compound and a peroxide may be modulated by addition of a ligand of a manganese ion and/or a compound that is capable of forming a ligand of a manganese ion. In one variation, the processes described herein include the step of adding a phosphate and/or adding a buffer. It is appreciated that a buffer comprising phosphate may also be used. In particular, it has also been discovered herein that the phosphate stabilizes the reaction of manganese compounds and peroxides, such as by slowing the reaction of peroxide with $MnO_2$ to allow its use in the remediation of environmental contaminants. Without being bound by theory, it is believed herein that the reaction is slowed by one or more mechanisms involving phosphate, including forming a ligand with Mn(II) and/or Mn(III) ions formed as part of the manganese redox cycling, and/or adsorbing to $MnO_2$ surfaces and isolating the surfaces from attack by $H_2O_2$ thus preventing or slowing reaction of the $MnO_2$ surface with hydrogen peroxide (see, e.g. Perez-Benito, J. F., and Arias, C. 1992. Occurrence of colloidal manganese dioxide in permanganate reactions. Journal of Colloid and Interface Science, v. 152, p. 70-84).

It has been reported that Mn(IV), such as Mn(IV) in the form of manganese dioxide solids ($MnO_2$), can catalyze hydrogen peroxide to generate superoxide ($O_2^{\bullet-}$), the radical anion of dioxygen. It has been discovered that superoxide is a chemical reductant that may react with certain oxidized organic compounds in soil and groundwater, and in dissolved, soil-sorbed, and non-aqueous liquid phases, including dense non-aqueous liquid phases. Accordingly, but without being bound by theory, it is believed herein that the processes described herein may include the production of superoxide. In contrast, in the absence of either buffering or a ligand such as phosphate, it has been observed that peroxide is rapidly consumed, and reductants such as superoxide are only formed in small amounts, or for short periods of time. It has been observed herein that reductants or reductive radical compounds like superoxide are formed more efficiently from $MnO_2$ at near neutral pH rather than at highly basic or acidic pH. Further, it has been reported that though reductive radical compounds like superoxide are formed at acidic pH, the superoxide ($pK_a$=4.8) converts to its acid form, the hydroperoxide radical ($HO_2^{\bullet}$). It has been reported that hydroperoxide radical is not a reductant but instead a weak oxidant. In another embodiment, the processes described herein are performed at or near a pH of 7. It has been observed herein that methods described herein more efficiently produce reductive radical compounds like superoxide than other methods. In one aspect, reductive radical compounds like superoxide are formed at higher concentration relative to other methods. In another aspect, reductive radical compounds like superoxide are formed at higher concentration relative to oxidizing radicals like hydroxyl radical relative to other methods. For example, on the basis of consumed amount of peroxides, more reductive radical compounds like superoxide may be formed in the methods described herein.

In another embodiment, the processes include phosphate at a concentration in the range from about 0.01 M to about 10 M, from about 0.05 M to about 10 M, from about 0.1 M to about 10 M, from about 1 M to about 10 M, from about 0.05 M to about 5 M, from about 0.05 M to about 2.5 M, from about 0.05 M to about 1 M, from about 0.1 M to about 5 M, from about 0.1 M to about 2.5 M, from about 0.1 M to about 2 M, or from about 0.1 M to about 1 M. In another embodiment, the processes include phosphate at a concentration of about 1 M. In another embodiment, the processes include phosphate buffered at a pH in the range from about 6 to about 10, from about 6 to about 9, from about 6.5 to about 8.5, from about 6.5 to about 8, from about 7 to about 8, from about 6.8 to about 7.5, or of about 7. Such buffered phosphate may be prepared by conventional processes, such as from mixtures of phosphate salts, including $Na_2HPO_4$, $K_2HPO_4$, $NaH_2PO_4$ and/or $KH_2PO_4$. However, it is to be understood that other ligands, and or other buffering agents instead of or in addition to phosphate are also described in variations of these embodiments.

It is to be understood that other buffers may be included in processes described herein, including but not limited to, TRIS, HEPES, PIPES, and like organic buffers, and bicarbonates, carbonates, pyrophosphates, and like inorganic buffers.

It is to be understood that other ligands may be included in processes described herein, including but not limited to, citrate, malonate, phytate. Illustrative other ligands that have been reported to chelate metals include but not limited to EDDS, HEIDA, GEIDA, IDS, DTPA, MGDA, and the like.

In another illustrative embodiment, processes are described for generating a chemical reductant, such as superoxide, for use in treating a contamination of soil and/or groundwater. It is to be understood that the processes may be performed in-situ or ex-situ. In one aspect, the processes are capable of reacting with or decomposing organic compounds, including those organic compounds that may be unreactive or slow to react in other treatment methods, such as methods that use only oxidants.

In another illustrative embodiment, processes are described where both the chemical reductants and chemical oxidants are generated at a site, and/or generated first then delivered to a site containing contaminated soil or groundwater. In one variation, the chemical reductants and chemical oxidants are generated simultaneously. In another variation, the chemical reductants and chemical oxidants are generated sequentially. It is understood that the chemical reductants and chemical oxidants may be generated in any order. It is also understood that the chemical reductants and chemical oxidants are capable of reacting/decomposing contaminant plumes that include compounds that can be either oxidized and/or reduced.

The processes described herein may be used under a variety of contamination conditions, including but not limited to contaminants in non-aqueous phase liquids (NAPLs), in dense non-aqueous phase liquids (DNAPLs), sorbed to soil, located in vadose zones, located in saturated zones, and/or dissolved in groundwater.

Further, it has been reported that superoxide may also be responsible for desorption of organic compounds from soil-sorbed phases, and enhancing dissolution of organic compounds from non-aqueous phase liquids making them more susceptible to remediation. It is understood that superoxide formation is favored at near-neutral pH, thus pH adjustment to strongly acidic or strongly basic conditions may not be required in the processes described herein. Further, it is understood herein that maintaining the pH near neutrality may be advantageous in the processes described herein.

In another embodiment, the processes described herein include the optional step of adjusting the pH at the site before and/or during the remediation. It is to be understood that the pH may be adjusted in the soil and/or groundwater at the treatment site before and/or during the remediation.

In one alternative, the pH at the site, such as the pH of the groundwater is below or substantially below about pH 7, and the step of adjusting the pH includes adding/introducing/administering a base, such as an aqueous solution of base, to the site. Illustrative bases include NaOH, KOH, $Na_3PO_4$, $K_3PO_4$, $KH_2PO_4$, $K_2HPO_4$, and the like, and combinations thereof. The aqueous solution of base may be at a wide variety of concentrations, and may be adjusted and/or selected depending upon the specific conditions at the site. In one embodiment, illustrative concentrations are in the range from about 0.1 M to about 15 M, from about 0.1 M to about 10 M from about, 0.1 M to about 1 M, from about 1 M to about 15 M, from about 1 M to about 10 M, from about 1 M to about 2 M, and the like. In another embodiment, illustrative concentrations on a weight/weight basis are in the range from about 1% to about 50%, from about 1% to about 40%, from about 1% to about 30%, from about 1% to about 30%, from about 1% to about 20%, from about 1% to about 10%, from about 10% to about 30%, from about 10% to about 20%, and the like. In another embodiment, the pH of the base solution is illustratively in the range from about 7.5 to about 13, from about 8 to about 13, from about 9 to about 13, from about 10 to about 13, from about 7.5 to about 11, from about 8 to about 11, from about 9 to about 11, from about 10 to about 11, from about 8 to about 10, from about 9 to about 10, from about 8 to about 9, and the like.

In another alternative, the pH at the site, such as the pH of the groundwater is above or substantially above about pH 7, and the step of adjusting the pH includes adding/introducing/administering an acid, such as an aqueous solution of acid, to the site. Illustrative acids include mineral acids, such as $H_2SO_4$, $H_3PO_4$, and the like, and combinations thereof. The aqueous solution of acid may be at a wide variety of concentrations, and may be adjusted and/or selected depending upon the specific conditions at the site. In one embodiment, illustrative concentrations are in the range from about 0.001 M to about 10 M, from about 0.001 M to about 5 M, from about 0.001 M to about 2 M, from about 0.001 M to about 1 M, from about 0.001 M to about 0.1 M, from about 0.001 M to about 0.05 M, from about 0.001 M to about 0.01 M, from about 0.01 M to about 10 M, from about 0.01 M to about 5 M, from about 0.01 M to about 2 M, from about 0.01 M to about 1 M, from about 0.01 M to about 0.1 M, from about 0.01 M to about 0.05 M, from about 0.1 M to about 10 M, from about 0.1 M to about 5 M, from about 0.1 M to about 2 M, from about 0.1 M to about 1 M, from about 1 M to about 10 M, from about 1 M to about 5 M, from about 1 M to about 2 M, and the like.

In another embodiment, illustrative concentrations on a weight/weight basis are in the range from about 0.01% to about 50%, from about 0.01% to about 25%, from about 0.01% to about 20%, from about 0.01% to about 10%, from about 0.01% to about 5%, from about 0.01% to about 1%, from about 0.01% to about 0.5%, from about 0.01% to about 0.1%, from about 0.01% to about 0.05%, from about 0.1% to about 50%, from about 0.1% to about 25%, from about 0.1% to about 20%, from about 0.1% to about 10%, from about 0.1% to about 5%, from about 0.1% to about 1%, from about 0.1% to about 0.5%, from about 1% to about 50%, from about 1% to about 25%, from about 1% to about 20%, from about 1% to about 10%, from about 10% to about 97%, from about 10% to about 50%, from about 10% to about 25%, from about 10% to about 20%, and the like.

Illustrative concentrations of $H_2SO_4$ include about 97% concentrated acid (about 18 normal), about 74% tower or Glover acid (about 12 molar) about 62% chamber or fertilizer acid (about 10 molar), about 34% battery acid (about 4 molar), 10%, dilute sulfuric acid (about 1 molar), and the like. In another embodiment, the pH of the acid solution is illustratively in the range from about −3 to about 6.5, from about −3 to about 5, from about −3 to about 4, from about −3 to about 2, from about −3 to about 1, from about −3 to about 0, from about −1 to about 6, from about −1 to about 5, from about −1 to about 4, from about −1 to about 3, from about −1 to about 2, from about 1 to about 6, from about 1 to about 5, from about 1 to about 4, from about 1 to about 3, from about 1 to about 2, from about 2 to about 6, from about 2 to about 5, from about 2 to about 4, from about 2 to about 3, and the like.

In another embodiment, the pH is adjusted before the addition of the Mn(IV) or the compound capable of generating Mn(IV). In another embodiment, the pH is adjusted after the addition of the Mn(IV) or the compound capable of generating Mn(IV). In another embodiment, the pH is adjusted after the addition of the Mn(IV) or the compound capable of generating Mn(IV), but before the addition of the peroxide or the compound capable of forming a peroxide. In another embodiment, the pH is adjusted both before and after the addition of the Mn(IV) or the compound capable of generating Mn(IV). In another embodiment, the pH is adjusted both before and after the addition of the Mn(IV) or the compound capable of generating Mn(IV), but before the addition of the peroxide or the compound capable of forming a peroxide. It is to be understood that in each of the foregoing embodiments, the pH adjusting step may be performed more than one once. It is also to be understood that in embodiments of the processes described herein where multiple administrations of the peroxide or the compound capable of forming a peroxide are made, additional pH adjusting steps may be performed before each or before certain administrations of the peroxide or the compound capable of forming a peroxide.

It is appreciated that manganese may also undergo a complex series of associated reactions, producing both oxidants and reductants, including regenerating Mn(II) as a catalyst. For example, manganese can participate in the following reaction to produce hydroxyl radical:

$$2Mn^{+2} + 2H_2O_2 \rightarrow 2Mn^{+3} + 2OH^- + 2OH$$

However, though superoxide radical may be formed, it is understood either to form with very low yield or to react with other species more rapidly than with the organic contaminants that are desirably treated, such as the carbon tetrachloride. Nonetheless, at neutral or near neutral pH, the Mn(II) oxidizes to Mn(IV) and precipitates as $MnO_2$:

$$Mn^{+2} + 2H_2O \rightarrow MnO_2(s) + 2e^- + 4H^+$$

Hydrogen peroxide reacts with Mn(IV) on the $MnO_2$ surface to yield superoxide, a reductive radical compound:

$$Mn^{+4} + H_2O_2 \rightarrow Mn^{+3} + 2H^+ + O_2^{\bullet -}$$

$$Mn^{+3} + H_2O_2 \rightarrow Mn^{+2} + 2H^+ + O_2^{\bullet -}$$

The Mn(II) then cycles back to Mn(IV), as shown above or via reaction with other intermediate species. As used herein, the term manganese redox cycling refers generally to this collection of manganese reactions.

However, it is appreciated that remediation, such as in-situ remediation, may not occur by only contacting the site, such as by injection, with a source of Mn(IV) based on one or more of the following observations: (a) Mn(IV) is insoluble, and precipitates as solid $MnO_2$ under typical groundwater conditions; a mechanism to effectively distribute Mn(IV) (as solid $MnO_2$ or some other method) in the subsurface has not been reported heretofore; (b) although naturally-occurring manganese in soils is commonly in the Mn(IV) valence state as solid $MnO_2$, it is generally not found in sufficient concentrations to support an in-situ treatment; and (c) at circumneutral pH, the rate of hydrogen peroxide reaction in the presence of $MnO_2$, such as to form reductants including superoxide, is very rapid. Accordingly, it is understood that the reaction is desirably modulated, stabilized, slowed, or regulated to allow increased and/or prolonged production of reductive radical compounds, like superoxide for remediation of highly oxidized carbon compounds. In addition, it is understood that the Mn(IV) is desirably distributed throughout at least a majority of the site prior to reaction.

Accordingly, in another embodiment, the processes described herein include the step of adding or introducing permanganate anion ($MnO_4^-$) to a site. Permanganate anion is a compound capable of generating Mn(IV). It is understood that permanganate anion is a strong oxidant that can react with certain types of organic compounds including, but not limited to, tetrachloroethene, trichloroethene, ethylene dibromide, naphthalene, and the like. However, it is also understood that permanganate anion does not generally react with highly oxidized compounds such as chloromethanes, PCBs, and the like. It is to be understood that reaction with a contaminant is part of the overall process of remediation. In some instances, remediation includes an oxidation of the contaminant, while in other instances remediation includes a reduction of the contaminant. It is also to be understood that other processes mediated by the processes described herein and/or not mediated by the processes described herein may also operate to contribute to the overall remediation of the contamination.

It is also appreciated that the processes described herein may have the desirable characteristics that (a) permanganate is already widely used in In-situ Chemical Oxidation (ISCO) processes; (b) permanganate solutions already have a near-neutral pH; (c) permanganate will oxidize certain contaminant compounds If present, such as primarily unsaturated aliphatics such as perchloroethylene (PCE), trichloroethylene (TCE), dichloroethylene (DCE), and vinyl chloride (VC), thus also contributing to the overall treatment as well as providing the $MnO_2$ catalyst; (d) the permanganate reduction reaction may preferentially occur in zones with the highest concentration of organic compounds, which is commonly also the most-contaminated portion of the treatment zone; thus the $MnO_2$ catalyst will subsequently be concentrated in the most contaminated zones of the aquifer; and (e) a solid is precipitated within the treatment area, and thus the catalyst becomes "fixed" and is not easily displaced by injection of additional liquids, resulting in efficient mixing of the $MnO_2$ catalyst and the subsequently-injected components, including the one or more peroxides, ligands, buffers, and the like, as described herein.

In another embodiment, processes are described where permanganate is injected or mixed into contaminated soil or groundwater, in-situ or ex-situ. Various forms of permanganate may be used, including but not limited to, permanganate salts, such as potassium, sodium, calcium, and the like. It is appreciated that the more soluble sodium salt may be desirably used in the processes described herein. The permanganate anion will react with oxidizable organic and inorganic compounds, resulting in reduction of the anion and precipitation of $MnO_2$ solids. It is believed herein that the reaction will occur preferentially at the location of heavy contamination, such as for example on the surface of non-aqueous phase liquids or in soil where organic compounds are strongly sorbed. Accordingly, but without being bound by theory, it is believed that after reduction of the permanganate to $MnO_2$, a peroxide can be introduced, or a peroxide solution can be injected or mixed with the soil and/or groundwater to react with the $MnO_2$ and generate superoxide. The superoxide produced may react with the oxidized organic compounds. Illustrative peroxides include hydrogen peroxide, which may be in solution at a variety of concentrations, calcium peroxide, magnesium peroxide, which may be solids, or solutions, and the like. It is understood that solid peroxides, such as calcium peroxide and magnesium peroxide may generate hydrogen peroxide upon dissolution or within certain pH ranges during performance of the processes described herein.

Illustratively, the peroxide is hydrogen peroxide, which may be a dilute or concentrated aqueous solution. Illustrative concentrations of hydrogen peroxide are in the range from about 3% to about 50% by weight in water. In one variation, the peroxide compound is a 50% by weight solution of hydrogen peroxide in water. In another variation, the peroxide compound is a 34-50% by weight solution of hydrogen peroxide in water. In another variation, the peroxide compound is a 30-32% by weight solution of hydrogen peroxide in water. In another variation, the peroxide compound is a 30% by weight solution of hydrogen peroxide in water. In another variation, the peroxide compound is a 10% by weight solution of hydrogen peroxide in water. In another variation, the peroxide compound is a 3% by weight solution of hydrogen peroxide in water. In each of the foregoing embodiments, it is also appreciated that other compounds capable of forming hydrogen peroxide may be used alone or alternatively included with hydrogen peroxide, or other solid peroxides. Illustrative compounds capable of forming hydrogen peroxide include, but are not limited to sodium percarbonate, and the like.

In each of the foregoing embodiments, it is appreciated that other sources of manganese may be used alone or alternatively included with the permanganate, including but not limited to, soluble forms of manganese, such as $MnSO_4$, and chelated forms of manganese, such as Mn-EDTA, and the like. Regarding chelated forms of manganese, such as Mn-EDTA, and the like, it is appreciated that (a) the pH of the Mn-EDTA solution is as described herein, or alternatively near neutral, or close to 7 and thus favorable for superoxide formation without pH adjustment; and (b) the Mn-EDTA is stable in groundwater and can be readily distributed in the aquifer. However, it is also understood that the EDTA is an organic compound that may be reactive towards hydrogen peroxide, and therefore presents an additional demand for oxidants or reductants in addition to the targeted contaminant compounds and other reactions occurring in the aquifer.

Regarding soluble forms of manganese, such as $MnSO_4$, and the like, it is appreciated that the $MnSO_4$ solution is desirably acidic upon introduction in order to remain dissolved. The natural buffering capacity of the aquifer may consume the acidity, or bases such as KOH may be injected after the $MnSO_4$ solution, neutralizing the acidity and resulting in oxidation of the Mn(II) to Mn(IV) with precipitation of $MnO_2$:

$$Mn^{+2}+4OH^-\rightarrow MnO_2(s)+2H_2O+2e^-$$

In another embodiment, processes are described herein that also generate oxidizing radicals like hydroxyl radicals. It is understood that oxidizing radicals like hydroxyl radicals may be generated via redox cycling of the manganese between the Mn(II), Mn(III), and Mn(IV) valence states and reaction with hydrogen peroxide. It is also understood that hydroxyl radicals may be generated via reaction of hydrogen peroxide with other naturally-occurring transition metals in the soil and/or groundwater. Without being bound by theory, it is appreciated that the hydroxyl radicals formed in these embodiments of the processes described herein may react with many other compounds and allow treatment of plumes consisting of many types of contaminants.

In another embodiment, the contaminated site is delineated prior to and in conjunction with use of the processes described herein. Such delineation includes, but is not limited to, analysis of the contaminant(s), such as contaminant(s) identity, contaminant(s) amount, and contaminant(s) distribution; analysis of the physical properties of the soil and/or groundwater to be treated, such as grain size, hydraulic conductivity, depth to groundwater, direction and velocity of groundwater flow, and the like; and analysis of the chemical properties of the soil and/or groundwater, such as pH, oxidation-reduction potential, and the like.

In another embodiment, a water-soluble permanganate compound, such as potassium permanganate, sodium permanganate, and the like, is first delivered to the contaminated soil and/or groundwater. Without being bound by theory, it is believed that the permanganate ion ($MnO_4^-$) reacts with organic and/or inorganic compounds in the soil or aquifer, and subsequently precipitates a reduced form of manganese (IV), such as $MnO_2$. It is understood that such reaction with organic and/or inorganic compounds that are also contaminants may add to the overall remediation that takes place using the process.

It is appreciated that when using a Mn(IV) generating compound, sufficient time may be necessary for the Mn(IV) generating compound to generate Mn(IV), such as before the application of the peroxide or peroxide generating compound. It is further appreciated that the time required for Mn(IV) generation may vary with the specific conditions present at the site being treated. It is to be understood that Mn(IV) generation may be monitored. For example, in one embodiment, the Mn(IV) generating compound is a permanganate. Mn(IV) generation may be monitored by the disappearance of the permanganate by any one of a variety of conventional analytical methods, including but not limited to visual colorimetric assay. In such embodiments, it is to be understood that the buffer, and/or the optional pH adjusting agent, may be applied at any time, such as immediately after or soon after the application of the Mn(IV) generating compound, anytime before the application of the peroxide or peroxide generating compound, or contemporaneously or simultaneously with the application of the peroxide or peroxide generating compound.

Following or contemporaneous with the addition of the permanganate ion, a buffering compound or solution is then distributed through the soil and/or aquifer. In one variation, the buffering solution is as described herein, such as but not limited to a phosphate buffer at a concentration in the range from about 0.1 M to about 10 M, from about 0.5 M to about 1.5 M, or of about 1 M.

In another variation, the buffering solution is a phosphate buffer at a pH in the range from about 6 to about 10, from about 6 to about 9, from about 6 to about 8.5, from about 6 to about 8, from about 6.5 to about 10, from about 6.5 to about 9, from about 6.5 to about 8.5, from about 6.5 to about 8, from about 7 to about 10, from about 7 to about 9, from about 7 to about 8.5, from about 7 to about 8, or near-neutral, such as at about 6.8, at about 7, at about 7.2, at about 7.4, at about 7.6, or at about 7.8. Following or contemporaneous with the addition of the permanganate ion, and/or with the addition of the buffering compound or solution, a hydrogen peroxide solution, solid peroxide, and/or other peroxide generating compound is then introduced, distributed, and/or allowed to distribute through the soil and/or aquifer. Without being bound by theory, it is believed herein that the peroxide reacts with the Mn(IV) to produce superoxide. In addition, it is appreciated that the peroxide may also react with other transition metals to produce hydroxyl radicals, which may add to the overall remediation accomplished by the process by reacting with other compounds, whether or not destroyed or decomposed by the superoxide. It is to be understood that the buffering compound or solution may be mixed directly with the peroxide, such as hydrogen peroxide for injection.

In one variation of the processes described herein, it is understood that the process may be performed in-situ or ex-situ. In another variation, the permanganate may be delivered to the impacted media as a liquid or as a solid. In another variation, both liquid and solid forms of chelated manganese, such as Mn-EDTA, may be delivered to the impacted media.

In another embodiment, the permanganate or other manganese reagent, the peroxide or peroxide forming compound, the buffer, and/or the compound capable of forming a ligand with manganese may be delivered in-situ via wells, borings, infiltration galleries, trenches, excavations, and the like. In another embodiment, the permanganate or other manganese reagent may be physically mixed with the soil for either in-situ or ex-situ applications.

It is appreciated herein that oxidizing radicals like hydroxyl radical may also be formed in the processes described herein. It is therefore understood that the processes described herein may also concomitantly lead to the remediation of contaminants that react with oxidizing agents, such as hydroxyl radical. Without being bound by theory, it is understood that hydroxyl radicals may also be produced in the processes described herein, such as by reaction with transition metal ions already present in the soil and groundwater.

Accordingly, such production of hydroxyl radicals may be enhanced or accelerated by the addition of transition metal ions, such as iron ion. In another embodiment, a transition metal ion is also added. The transition metal ion may be a salt, a chelate, or a mixture thereof, including but not limited to iron ions such as soluble Fe(II) salts and/or chelated forms of Fe(II) or Fe(III), or other transition metal ions. It is appreciated that the additional transition metal ions, such as iron ions may more efficiently catalyze hydroxyl radical formation, either simultaneously with the superoxide, or sequentially with superoxide formation. In one variation, the transition metal ions, such as iron ions, are added before addition of a peroxide, or before superoxide formation. In one variation, the time lapse between addition of a peroxide, or before superoxide formation is sufficiently long to allow for a predetermined amount of Mn(IV) ion to be produced.

In another embodiment, the contaminants are one or more chloromethanes, such as carbon tetrachloride, chloroform, and methylene chloride, acetone, one or more nitroaromatics, such as nitrobenzene and trinitrotoluene, one or more Freons™, one or more polychlorinated biphenyls (PCBs), and the like. It is appreciated that chloromethanes in particular are considered highly oxidized and may be effectively treated via reductive mechanisms. Without being bound by theory, it is appreciated that such chloromethanes may not be destroyed or decomposed by oxidative processes, and instead may be destroyed or decomposed by reductive processes, such as those described herein. It is further appreciated that normal oxidative treatment methods may not be effective on the chloromethanes. It is further appreciated that additional organic compound that may be destroyed or decomposed by oxidative processes, such as by reacting with hydroxyl radical, and can be treated by the processes described herein. It is further appreciated that additional organic compound that may be destroyed or decomposed by either oxidative processes, or reductive processes, and can be treated by the processes described herein. Illustrative examples of compounds that may be destroyed or decomposed by oxidative processes described herein, include, but are not limited to, certain polychlorinated biphenyls (PCBs), unsaturated chlorinated aliphatics such as tetrachloroethene (perchloroethylene, PCE), trichloroethene (trichloroethylene, TCE), dichloroethylene, and vinyl chloride, saturated chlorinated aliphatics, such as 1,1,1-trichloroethane, 1,1,2-trichloroethane (TCA), monoaromatics, such as benzene, toluene, ethylbenzene, xylene (also referred to as BTEX), halobenzenes such as chlorobenzene, polyaromatics such as naphthalene, polycyclic aromatics such as benzo(a)pyrene, primary aromatic amines such as anilines, substituted phenols such as chlorophenols, ethers and alcohols, such as methyl tertiary butyl ether and tert-butyl alcohol, hydrocarbons such as unsaturated and saturated alkenes and alkanes, nitroaromatics such as nitrobenzene and trinitrotoluene, inorganic compounds such as hexavalent chromium, and the like.

Additional illustrative compounds that may be destroyed by the processes described herein, include but are not limited to pesticides, such as methoxychlor, DDT, lindane, endrin, chlordane, alachlor, atrazine, and the like. Additional illustrative compounds that may be destroyed by the processes described herein, include but are not limited to carbon disulfide, quinines, hydroquinones, formate, organic acids, and the like.

In another embodiment, processes described herein are useful in remediation of sorbed-phase contaminants and/or contaminants in non-aqueous phase liquid (NAPL) forms. It is also appreciated that superoxide can also desorb compounds from such sites, as described herein (see, e.g., Watts, R. J., Bottenberg, B. C., Hess, T. F., Jensen, M. D., and Teel, A. L. 1999. Role of reductants in the enhanced desorption and transformation of chloroaliphatic compounds by modified Fenton's reactions. *Environmental Science & Technology*, v. 33, p. 3432-3437; Watts, R. J., Howsawkeng, J., and Teel, A. L. 2005. Destruction of a carbon tetrachloride dense non-aqueous phase liquid by modified Fenton's reagent. Journal of Environmental Engineering, v. 131, p. 1114-1119; Smith, B. A., Teel, A. L., and Watts, R. J. 2006. Mechanism for the destruction of carbon tetrachloride and chloroform DNAPLs by modified Fenton's reagent. *Journal of Contaminant Hydrology*, v. 85, p. 229-246; the disclosures of which are incorporated herein by reference). It is appreciated that absent desorption, the contaminant compounds may be more difficult to treat or more slowly destroyed or decomposed. In addition, it is to be understood that the processes described herein may be used to desorb compounds not necessarily for direct destruction but to make them available for other processes that may be performed in conjunction with the processes described herein, including conventional processes that would otherwise be unsuccessful absent the desorption step performed by the processes herein. Illustrative other treatment methods include, but at not limited to, oxidative destruction methods.

It is appreciated that the processes described herein may be adapted for use with other processes owing to the observation that the described processes are able to distribute manganese in the site though the processes include introduction of material to only a few locations. Such distribution may be exploited by other processes in addition to the processes described herein for the generation of superoxide across a well-distributed area of treatment. In addition, it is appreciated that not only may the distribution be more wide spread than conventional methods, but also may be more uniformly distributed over a large area.

In variations of the embodiments described herein, the distribution pattern though wide spread, is less uniform. It is appreciated that such less uniform or non-uniform distribution may facilitate remediation recognizing that contamination may not be uniform in the treatment area. For example, it is believed that contamination will form pockets or regions of high concentration in certain areas and low concentration in other areas as a consequence of many factors, such as soil composition, the nature of how the contaminant was introduced, and others. Without being bound by theory, it is believed that the higher concentrations of the non-uniform contamination will be preferentially targeted for remediation using the processes described herein because more manganese (IV) catalyst will be directed to those locations.

It is appreciated that the processes described herein may be more cost-effective and/or may afford remediation of a site in a more rapid manner, as compared to conventional processes, such as over a period of weeks or months rather than years. In another illustrative embodiment, the processes are performed for a period of less than two years, less than a year, less than 9 months, or less than 6 months.

In another illustrative embodiment, the kits and packages are described herein, where the kit or packet includes a predetermined amount of a permanganate salt, a buffer, and a peroxide compound or a compound capable of forming a peroxide, where the predetermined amount of each component is relative to the other and configured for generation of superoxide after contact with the treatment site. In another embodiment, the kits described herein include a predetermined amount of a Mn(IV) compound and/or a compound capable of generating Mn(IV); a predetermined amount of a stabilizer in the form of a buffered aqueous solution, such as a buffered aqueous solution having a pH in the range from about 6 to about 10; and a predetermined amount of a peroxide compound or a compound capable of forming a peroxide. In another embodiment, the kits described herein include a premeasured amount of a mixture of a buffer; and a peroxide compound or peroxide generating compound. In another embodiment, the kits described herein include a premeasured amount of a mixture of a stabilizer in the form of a buffered aqueous solution, such as a buffered aqueous solution having a pH in the range from about 6 to about 10; and a peroxide compound or peroxide generating compound. In one aspect, the predetermined amount corresponds to a buffer to peroxide compound or peroxide generating compound ratio in the range from about 1:1 to about 10:1, from about 1:1 to about 5:1, from about 1:1 to about 3:1, from about 2:1 to about 4:1, or at about 3:1, on a weight and/or volume basis. In another aspect, the predetermined amount corresponds to a stabilizer in the form of a buffered aqueous solution, such as a buffered aqueous solution having a pH in the range from about 6 to about 10; to peroxide compound or peroxide generating compound ratio in the range from about 1:1 to about 10:1, from about 1:1 to about 5:1, from about 1:1 to about 3:1, from about 2:1 to about 4:1, or at about 3:1, on a weight and/or volume basis. It is to be understood that the kit embodiments that include a mixture of the buffer and the peroxide compound or peroxide generating compound may also include the illustrative ratios described herein. It is to be further understood that the kit embodiments that include a mixture of the stabilizer in the form of a buffered aqueous solution, such as a buffered aqueous solution having a pH in the range from about 6 to about 10; and the peroxide compound or peroxide generating compound may also include the illustrative ratios described herein."

It is to be understood that the processes described herein may be performed using any technique capable of contacting the Mn(IV) or the compound capable of generating Mn(IV); the buffered aqueous solution, the compound capable of forming a ligand with manganese, the peroxide, and other components with the site that is to be treated, such as water, soil, a vadose zone, a saturated zone, groundwater, and the like. Illustrative methods and apparatus include, but are not limited to, contacting contamination via excavations, injection wells, and the like. It is also to be understood that any technique for introducing injection wells may also be used, including but not limited to, permanent wells, geoprobes, direct push techniques, auger drilling, and the like. Illustratively, the Mn(IV) and/or Mn(IV) generating compound may be introduced using fracture emplace processes and/or related process, such as those described by Siegrist et al. "In situ chemical oxidation by fracture emplaced chemical solids" J. Env. Engineering, 429-440 (May 1999), the disclosure of which is incorporated by reference."

The processes described herein may be used for remediation of low contamination, such as contamination below or in the part-per-billion range (e.g. µg/L), and for high contamination, such as contamination in the part-per-million (e.g. mg/L), or higher.

In another embodiment, the processes described herein may include adding stoichiometric amounts of the Mn(IV) or the compound capable of generating Mn(IV), the buffered aqueous solution, the compound capable of forming a ligand with manganese, the peroxide or compound capable generating peroxide, and other components compared to the quantity of contaminant targeted for remediation. In another embodiment, the processes described herein may include adding excess amounts of any one or more of the Mn(IV) or the compound capable of generating Mn(IV), the buffered aqueous solution, the compound capable of forming a ligand with manganese, the peroxide or compound capable generating peroxide, and/or other components compared to the quantity of contaminant targeted for remediation, where the fold-excess is illustratively in the range from about 4 to about 6, in the range from about 4 to about 8, in the range from about 8 to about 10, in the range from about 8 to about 14, in the range from about 10 to about 14, or in the range from about 12 to about 14, or as may be desirable for the particular conditions present at the site being treated. It is appreciated that in each of the foregoing, certain components, such as the Mn(IV) or the compound capable of generating Mn(IV), may be used catalytically. Illustratively, the ratio of Mn(IV) and/or the compound capable of generating Mn(IV) to peroxide and/or the compound capable of generating peroxide is in the range from about 1 to about 100, from about 1 to about 50, from about 1 to about 20, from about 1 to about 10, or from about 1 to about 5, or as may be desirable for the particular conditions present at the site being treated.

In another embodiment, described herein is a process for remediation of a site having one or more soil contaminants, one or more groundwater contaminants, or a combination thereof, the process comprising the steps of contacting the site with (a) Mn(IV) or a compound capable of generating Mn(IV); (b) a buffered aqueous solution having a pH in the range from about 6 to about 10; and (c) a peroxide or a compound capable of forming a peroxide.

In another embodiment, described herein is a process for remediation as described in the preceding embodiment, wherein the pH is in the range from about 6.5 to about 8.

In another embodiment, described herein is a process for remediation as described in any of the preceding embodiments, wherein the buffered aqueous solution further comprises one or more compounds capable of forming a ligand with manganese.

In another embodiment, described herein is a process for remediation of a site having one or more soil contaminants, one or more groundwater contaminants, or a combination thereof, the process comprising the steps of contacting the site with (a) Mn(IV) or a compound capable of generating Mn(IV); (b) one or more compounds capable of forming a ligand with a manganese ion; and (c) a peroxide or a compound capable of forming a peroxide.

In another embodiment, described herein is a process for remediation as described in the previous embodiment wherein the one or more compounds capable of forming a ligand with the manganese ion are included in a buffered aqueous solution having a pH in the range from about 6 to about 10.

In another embodiment, described herein is a process as described in any of the preceding embodiments, wherein the pH is in the range from about 6.5 to about 8.

In another embodiment, described herein is a process as described in any of the preceding embodiments, wherein at least one of the compounds capable of forming a ligand with the manganese ion is a phosphate compound.

In another embodiment, described herein is a process as described in any of the preceding embodiments, wherein the buffer is at a concentration in the range from about 0.1 molar to about 10 molar.

In another embodiment, described herein is a process as described in any of the preceding embodiments, wherein the buffer is at a concentration in the range from about 0.5 molar to about 1.5 molar.

In another embodiment, described herein is a process as described in any of the preceding embodiments, wherein the buffer is at a concentration of about 1 molar.

In another embodiment, described herein is a process as described in any of the preceding embodiments, wherein the buffer comprises one or more phosphate salts.

In another embodiment, described herein is a process as described in the previous embodiment, where at least one of the phosphate salts is selected from the group consisting of $Na_2HPO_4$, $K_2HPO_4$, $NaH_2PO_4$ and $KH_2PO_4$.

In another embodiment, described herein is a process as described in any of the preceding embodiments, wherein the compound capable of generating Mn(IV) comprises a permanganate compound.

In another embodiment, described herein is a process as described in the previous embodiment, wherein the Mn(IV) is formed upon contact of the permanganate salt with the soil or the groundwater, or a combination thereof.

In another embodiment, described herein is a process as described in any of the preceding embodiments, wherein the compound capable of generating Mn(IV) comprises a chelated manganese.

In another embodiment, described herein is a process as described in the previous embodiment, wherein the Mn(IV) is formed upon contact of the permanganate salt with the soil or the groundwater, or a combination thereof.

In another embodiment, described herein is a process as described in the previous embodiment, wherein the chelated manganese is Mn-EDTA.

In another embodiment, described herein is a process as described in any of the preceding embodiments, wherein the Mn(IV) is in the form of a $MnO_2$ precipitate.

In another embodiment, described herein is a process as described in any of the preceding embodiments, wherein the peroxide or the compound capable of forming the peroxide comprises hydrogen peroxide.

In another embodiment, described herein is a process as described in the previous embodiment, wherein the peroxide or the compound capable of forming the peroxide comprises calcium peroxide, magnesium peroxide, sodium percarbonate, or a combination thereof.

In another embodiment, described herein is a process as described in any of the preceding embodiments, wherein the process is capable of generating a reductive radical compound.

In another embodiment, described herein is a process as described in the previous embodiment, wherein the reductive radical compound is superoxide.

In another embodiment, described herein is a process as described in any of the preceding embodiments, wherein the contaminants comprise a compound capable of reacting with a reducing agent but not an oxidizing agent.

In another embodiment, described herein is a process as described in any of the preceding embodiments, wherein the contaminants comprise a highly oxidized carbon compound.

In another embodiment, described herein is a process as described in any of the preceding embodiments, wherein the contaminants comprise a compound capable of reacting with a reductive radical compound.

In another embodiment, described herein is a process as described in the previous embodiment, wherein the reductive radical compound is superoxide.

In another embodiment, described herein is a process as described in any of the preceding embodiments, wherein the contaminants comprise one or more chloromethanes.

In another embodiment, described herein is a process as described in any of the preceding embodiments, wherein the contaminants comprise one or more nitroaromatics, such as nitrobenzene and trinitrotoluene.

In another embodiment, described herein is a process as described in any of the preceding embodiments, wherein the contaminants comprise one or more components selected from the group consisting of carbon tetrachloride, chloroform, methylene chloride, acetone, freons, nitrobenzenes, hexavalent chromium and cyanide.

In another embodiment, described herein is a process as described in any of the preceding embodiments, wherein the process is capable of generating an oxidizing radical.

In another embodiment, described herein is a process as described in the previous embodiment, wherein the oxidizing radical is hydroxyl radical.

In another embodiment, described herein is a process as described in any of the preceding embodiments, wherein the contaminants comprise a compound oxidizable by the compound capable of generating Mn(IV).

In another embodiment, described herein is a process as described in any of the preceding embodiments, wherein the compound capable of generating Mn(IV) is permanganate, and the Mn(IV) is generated from the permanganate by reacting with the oxidizable compound.

In another embodiment, described herein is a process as described in the previous embodiment, wherein the oxidizable compound comprises one or more inorganic compounds.

In another embodiment, described herein is a process as described in the previous embodiment, wherein the oxidizable compound comprises one or more organic compounds.

In another embodiment, described herein is a process as described in any of the preceding embodiments, wherein the contaminants comprise one or more components selected from the group consisting of tetrachloroethene, trichloroethene, dichloroethylene, vinyl chloride, ethylene dibromide, polychlorinated biphenyls, and naphthalene.

In another embodiment, described herein is a process as described in any of the preceding embodiments, wherein the contaminants comprise a compound capable of reacting with an oxidizing agent and not a reducing agent.

In another embodiment, described herein is a process as described in any of the preceding embodiments, wherein the contaminants comprise an aromatic compound.

In another embodiment, described herein is a process as described in any of the preceding embodiments, wherein the contaminants comprise one or more compounds selected from the group consisting of monoaromatics, halobenzenes, polyaromatics, nitroaromatics, polycyclic aromatics, primary aromatic amines, substituted phenols, ethers and alcohols, hydrocarbons, unsaturated chlorinated aliphatic compounds, saturated chlorinated aliphatic compounds, carbon disulfide, quinones, hydroquinones, formate, and organic acids.

In another embodiment, described herein is a process as described in any of the preceding embodiments, wherein the contaminants comprise one or more compounds selected from the group consisting of benzene, toluene, xylene, ethylbenzene, chlorobenzene, naphthalene, trinitrotoluene, benzo(a)pyrene, anilines, chlorophenols, methyl tertiary butyl ether, tert-butyl alcohol, alkenes alkanes, perchloroethylene, trichloroethylene, 1,1,1-trichloroethane, 1,1,2-trichloroethane, carbon disulfide, quinones, hydroquinones, formate, and organic acids.

In another embodiment, described herein is a process as described in any of the preceding embodiments, wherein the contaminants comprise a pesticide.

In another embodiment, described herein is a process as described in any of the preceding embodiments, wherein the contaminants comprise a compound selected from the group consisting of methoxychlor, DDT, lindane, endrin, chlordane, alachlor, and atrazine.

In another embodiment, described herein is a process as described in any of the preceding embodiments, wherein steps (b) and (c) are performed contemporaneously.

In another embodiment, described herein is a process as described in any of the preceding embodiments, wherein steps (b) and (c) are performed simultaneously.

In another embodiment, described herein is a process as described in any of the preceding embodiments, wherein the peroxide or the compound capable of forming the peroxide has a half-life of at least about 30 minutes.

In another embodiment, described herein is a process as described in any of the preceding embodiments, wherein the Mn(IV) is preferentially precipitated on target contaminants and contaminated media.

In another embodiment, described herein is a process as described in any of the preceding embodiments, wherein the contaminant is dissolved, soil-sorbed, in a non-aqueous phase liquid, or a combination thereof.

In another embodiment, described herein is a process as described in the previous embodiment, wherein the non-aqueous phase liquid is a dense non-aqueous phase liquid.

In another embodiment, described herein is a process as described in any of the preceding embodiments, wherein the process is configured to desorb organic compounds from soil-sorbed phases, making them more susceptible to remediation.

In another embodiment, described herein is a process as described in any of the preceding embodiments, wherein the treatment is for a period of less than a year.

In another embodiment, described herein is a process as described in any of the preceding embodiments, wherein the process is non-enzymatic.

In another embodiment, described herein is a process as described in any of the preceding embodiments, further comprising the step of in situ oxidation chemical oxidation.

In another embodiment, described herein is a process for distributing Mn(IV) in a site having one or more soil contaminants, one or more groundwater contaminants, or a combination thereof, the process comprising the step of treating the site with a permanganate compound, where the site includes one or more transition metals in a quantity sufficient to reduce the permanganate, one or more organic compounds in a quantity sufficient to reduce the permanganate, or a combination thereof.

In another embodiment, described herein is a process as described in the previous embodiment, wherein at least one of the organic compounds is a contaminant.

In another embodiment, described herein is a process as described in the previous embodiment, further comprising the step of adding a buffer having a pH in the range from about 6 to about 8.

In another embodiment, described herein is a process as described in any one of claims 45 to 47 wherein the distribution is not uniform, and is relative to the concentration of contaminants at one or more predetermined locations.

In another embodiment, described herein is a process for desorbing one or more soil contaminants, one or more groundwater contaminants, or a combination thereof from a site containing said contaminants, the process comprising the step of treating the site with (a) a permanganate, (b) a buffer, and (c) a peroxide or a compound capable of forming a peroxide.

In another embodiment, described herein is a process as described in any of the preceding embodiments, wherein the site is a soil site.

In another embodiment, described herein is a process as described in any of the preceding embodiments, wherein the site is a groundwater site comprising a NAPL.

In another embodiment, described herein is a process for site remediation, where the site includes oxidizable and reducible contaminants, the process comprising the step of performing a manganese redox cycle at the site, where the manganese redox cycle is capable of both oxidizing and reducing the contaminants.

In another embodiment, described herein is a process as described in the previous embodiment, wherein the manganese redox cycle is performed by (a) contacting the site with a permanganate compound, (b) contacting the site with a buffer, and (c) contacting the site with a peroxide or a compound capable of forming a peroxide.

In another embodiment, described herein is a process as described in the previous embodiment, wherein the buffer comprises a phosphate compound.

In another embodiment, described herein is a kit comprising a permanganate salt, a phosphate buffer, and a peroxide or a compound capable of forming a peroxide, and a set of instructions.

In another embodiment, described herein is a kit as described in the previous embodiment, wherein the phosphate buffer and the peroxide or the compound capable of forming a peroxide are included in a ratio in the range from about 1:1 to about 10:1

In another embodiment, described herein is a kit as described in any of the previous embodiments, wherein the phosphate buffer and the peroxide or the compound capable of forming a peroxide are premixed.

EXAMPLES

Example 1

General Procedure for Site Remediation (1) Delineate the contamination and other site conditions.
(2) Install a plurality of injection wells
(3) Inject a first solution comprising Mn(IV) or a compound capable of generating Mn(IV):
   a. the first solution may be a permanganate, which will be reduced and form an $MnO_2$ precipitate;
   b. the first solution may be chelated manganese, for example Mn-EDTA;
   c. when injecting a compound capable of generating Mn(IV), optionally assess whether and to what extent Mn(IV) has been generated and/or precipitated.
(4) Inject a second solution comprising a stabilizer:
   a. the stabilizer may be a buffer, to control pH;
   b. the stabilizer may be a compound capable of forming a ligand with manganese;
   c. the stabilizer may be a phosphate that may act both as a ligand and may control pH.
(5) Inject a peroxide or a compound capable of forming a peroxide:
   a. the peroxide may be a hydrogen peroxide solution, a solid peroxide, or a solution prepared from a solid peroxide, or another compound that produces peroxide in solution, such as sodium percarbonate;

b. The stabilizer may be blended with the peroxide solution or may be injected separately.

(6) Contaminated soil and/or groundwater could also be treated ex-situ.

It is appreciated herein that when using a compound capable of generating Mn(IV), the substantial, near-complete, or complete conversion of the compound to Mn(IV), such as $MnO_2$ precipitate, may be advantageous prior to performing additional steps in the process. It is further appreciated herein that injecting the peroxide or the compound capable of forming a peroxide prior to substantial, near-complete, or complete generation of Mn(IV) may decrease the stabilization provided by the stabilizer. In that instance is to be understood that more treatments may be necessary, and or the treatments may need to performed more often. It is further appreciated that injecting the stabilizer prior to substantial, near-complete, or complete generation of Mn(IV) may decrease the stabilization provided by the stabilizer due to loss of injected material do to changing conditions at the site. In that instance is to be understood that more treatments may be necessary, and or the treatments may need to performed more often.

Additional details for contacting contaminated sites with remediation components are described in U.S. Pat. Nos. 5,525,008, 5,611,642, and 6,623,646, the disclosures of which are incorporated herein by reference in their entirety.

Example 2

Preparation of Manganese Dioxide

The $MnO_2$ was prepared in batches by reaction of aqueous $KMnO_4$ with trichloroethylene (TCE) with the following method (a total of six batches were prepared). Dissolve 66.66 g $KMnO_4$ into 3.34 L of deionized water in a 4-L Pyrex beaker. Stir with a magnetic stirrer until completely dissolved. Add 17.25 mL of reagent-grade TCE into 500 mL of deionized water in a second 4-L Pyrex beaker, and stir with a magnetic stirrer. Promptly begin adding the aqueous $KMnO_4$ solution dropwise, using a burette, into the TCE solution while stirring. Continue adding the $KMnO_4$ solution dropwise until the full volume has been blended into the TCE solution. Lightly cover the beaker. Allow the blended reagents to stir and digest for two days for complete reaction of the TCE. Turn off the stirrer, and allow the precipitate to settle to the bottom of the beaker. Using a ladle, remove as much of the residual permanganate solution as possible, without removing the $MnO_2$ precipitate. Transfer the residual solution and precipitate to 50-mL polypropylene centrifuge tubes. Centrifuge the residual to form a pellet of the $MnO_2$ precipitate, and dispose of the supernatant. Fill the centrifuge tube with deionized water to the 50-mL mark, vigorously shake to disaggregate the pellet, and centrifuge again. Repeat this process until the supernatant is free of residual permanganate (judged from the purple to pink color of the supernatant). Air-dry the residual $MnO_2$ precipitate on Pyrex watch glasses, and transfer to a glass jar for storage.

Example 3

One reactor is prepared with 100 mg of solid $MnO_2$ precipitated from sodium permanganate (prepared by reacting potassium permanganate with TCE, then collecting and rinsing the $MnO_2$ precipitate), and 20 mL of distilled water. Then, 20 mL of 3.6% $H_2O_2$ solution is added, and peroxide is analyzed. The reactors are periodically stirred between each phase of reagent addition, and also through the course of the monitoring period. The peroxide is fully consumed in less than 5 minutes, indicating very rapid reaction between the peroxide and the manganese dioxide. Four reactors are then prepared containing 100 mg of solid $MnO_2$ precipitated from sodium permanganate. Then, 20 mL of 1.0 M phosphate buffer at pH=6.8 is added, followed by 20 mL of 3.6% $H_2O_2$ solution. It is appreciated that the phosphate buffers may be prepared at any pH described herein, including near-neutral pHs of about 6.8, about 7, about 7.2, about 7.4, about 7.6, or about 7.8. The reactors are periodically stirred between each phase of reagent addition, and also through the course of the monitoring period. Peroxide concentration is analyzed over a period of 30 minutes, with the following results:

| Time (minutes) | $H_2O_2$ (mg/L) |
|---|---|
| 5 | 36,000 |
| 10 | 24,000 |
| 20 | 21,000 |
| 30 | 18,000 |

The results show that the phosphate buffer stabilizes the reaction between the $H_2O_2$ and the $MnO_2$, which is important for achieving distribution of the peroxide in the subsurface.

Example 4

Phosphate Buffer Stabilization 0.1 M and 1.0 M phosphate buffers were prepared with potassium monobasic phosphate ($KH_2PO_4$) and potassium dibasic phosphate ($K_2HPO_4$), at pH of 6.8. It is appreciated that the phosphate buffers may be prepared at any pH described herein, including near-neutral pHs of about 6.8, about 7, about 7.2, about 7.4, about 7.6, or about 7.8. 500 mg of $MnO_2$ was weighed into a 250-mL Erlenmeyer flask. 100 mL of phosphate buffer was added and the flask placed on a magnetic stirrer with a Teflon-coated stir bar. 100 mL of 3.8% $H_2O_2$ solution was added. $H_2O_2$ concentration was measured over time. Solution pH was measured periodically to assess pH stability. The analytical results are shown in the FIG. 1.

With the 0.1 M buffer, the peroxide was rapidly degraded (98% within 2.5 hours) and the pH was uncontrolled, increasing to over 8.0 within approximately 90 minutes. With the 1.0 M buffer, the peroxide exhibited an initially rapid degradation but stabilized at approximately 12,000 mg/L for over 2 hours, and pH was controlled. Based upon these results, a 1.0 M phosphate buffer was utilized for further tests.

Example 5

Preparation of Homogenized Groundwater for Initial Testing

One 1,000-mL bottle of groundwater from an existing contamination site was provided. The bottle contained visible droplets of DNAPL and sediment. The groundwater was centrifuged to separate the DNAPL and sediment, and then returned to a new (previously unused) 1,000-mL amber glass bottle. The groundwater was augmented with approximately 2 mg of reagent-grade toluene. Toluene was added to provide an analyte that was unreactive towards superoxide, but reactive towards hydroxyl radical, to assess the radical species generated. The sample bottle was mixed, tightly sealed, and allowed to equilibrate for eight days before performing tests.

Example 6

Reaction with Sodium Permanganate

Figure 2:
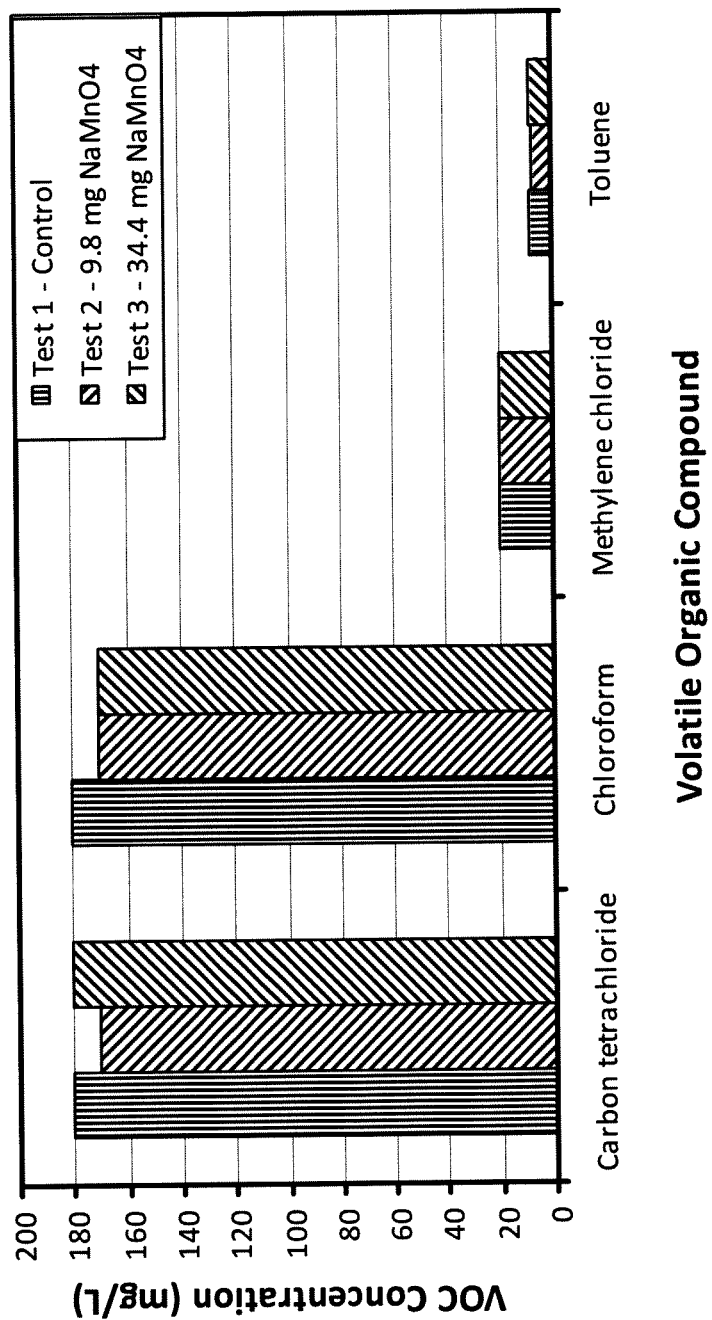
FIG. 2. shows reaction with sodium permanganate.

Degradation of chloromethanes by reaction with sodium permanganate was evaluated. Three 40-mL unpreserved VOA vials were prepared. One vial (Test 1) was utilized as a control and was filled with groundwater only. Two vials were loaded with sodium permanganate. Test 2 received 9.8 mg of 40% $NaMnO_4$ solution and Test 3 received 34.4 mg of 40% $NaMnO_4$. The $NaMnO_4$ solution was RemOx L™ from Carus Corporation. The vials were filled with groundwater, sealed and allowed to react for three days. The samples were then analyzed for carbon tetrachloride, chloroform, methylene chloride, chloromethane, and toluene, via EPA Method 624. The results are tabulated in Table 2, and selected Tests are shown in FIG. 2 (chloromethane was not detected and thus not shown).

TABLE 2

Analytical Results for Tests 1-16

| | Analyte | | | | |
|---|---|---|---|---|---|
| Test | Carbon Tetrachloride | Chloroform | Methylene Chloride | Chloromethane | Toluene |
| 1 | 180,000 | 180,000 | 20,000 | ND (<500) | 8,000 |
| 2 | 170,000 | 170,000 | 20,000 | ND (<500) | 7,400 |
| 3 | 180,000 | 170,000 | 20,000 | ND (<1,000) | 7,900 |
| 4 | 180,000 | 180,000 | 20,000 | ND (<1,000) | 8,100 |
| 5 | 190,000 | 190,000 | 22,000 | ND (<1,000) | 8,600 |
| 6 | 48,000 | 67,000 | 8,100 | ND (<1,000) | 2,800 |
| 7 | 15,000 | 32,000 | 4,000 | ND (<200) | 1,100 |
| 8 | 51,000 | 130,000 | 16,000 | ND (<1,000) | 5,000 |
| 9 | 200,000 | 220,000 | 20,000 | ND (<1,000) | NA |
| 10 | 170,000 | 210,000 | 18,000 | ND (<1,000) | NA |
| 11 | 160,000 | 200,000 | 17,000 | ND (<1,000) | NA |
| 12 | 140,000 | 190,000 | 17,000 | ND (<1,000) | NA |
| 13 | 190,000 | 220,000 | 19,000 | ND (<1,000) | NA |
| 14 | 160,000 | 210,000 | 18,000 | ND (<1,000) | NA |
| 15 | 110,000 | 150,000 | 14,000 | ND (<1,000) | NA |
| 16 | 70,000 | 130,000 | 12,000 | ND (<1,000) | NA |

Notes:
All results are in units of µg/L.
ND indicates analyte was not detected at the quoted reporting limit.
NA indicates analyte was not analyzed.

None of the tested volatile organic compounds (VOCs) exhibited significant degradation relative to the control, indicating no measurable reaction with sodium permanganate.

Example 7

Reaction with Manganese Dioxide

Figure 3:
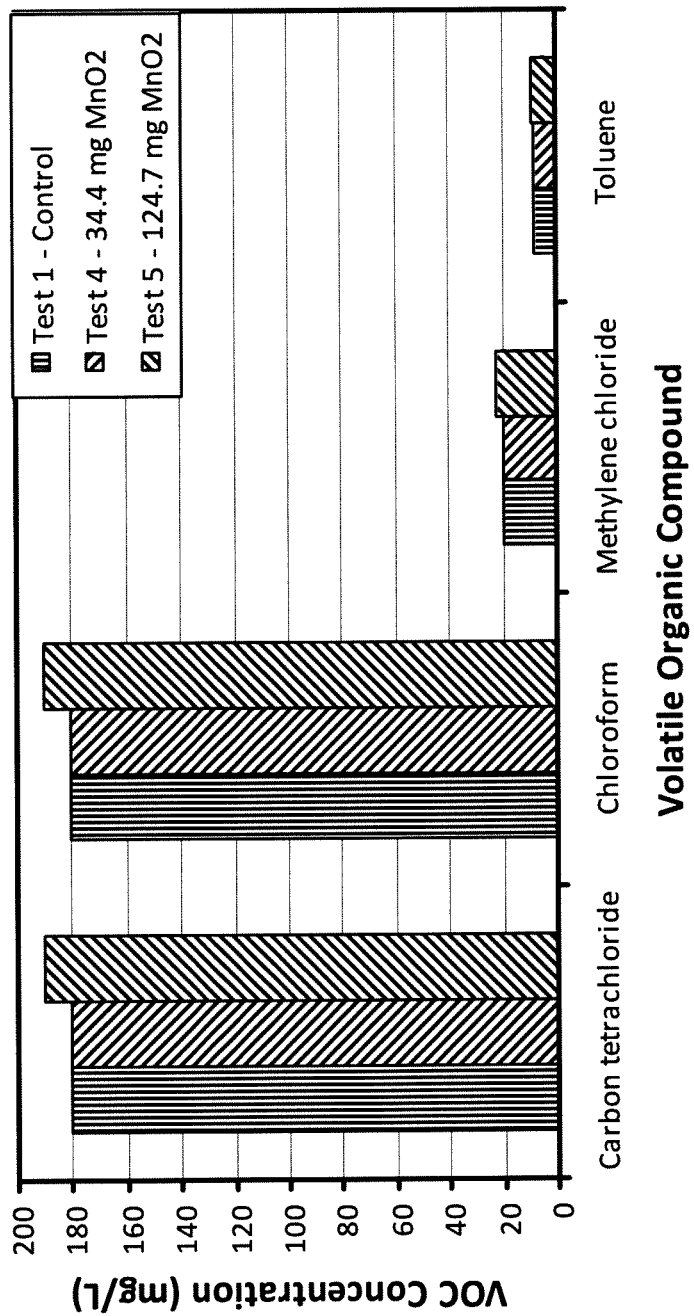
FIG. 3. shows reaction with manganese dioxide.

Direct reaction of chloromethanes with $MnO_2$ was also evaluated. These tests were performed concurrently with Tests 1, 2, and 3. Thus, Test 1 also represents a control for this series of tests. Two 40-mL unpreserved VOA vials were prepared. Test 4 received 12.8 mg of $MnO_2$ and Test 5 received 124.7 mg of $MnO_2$. The vials were filled with groundwater, sealed and allowed to react for three days. The samples were then analyzed for carbon tetrachloride, chloroform, methylene chloride, chloromethane, and toluene via EPA Method 624. The results are provided in FIG. 3 (chloromethane was not detected and thus not shown) and tabulated in Table 2. None of the tested VOCs were degraded relative to the control, indicating no measurable reaction with $MnO_2$.

Example 8

Figure 4:
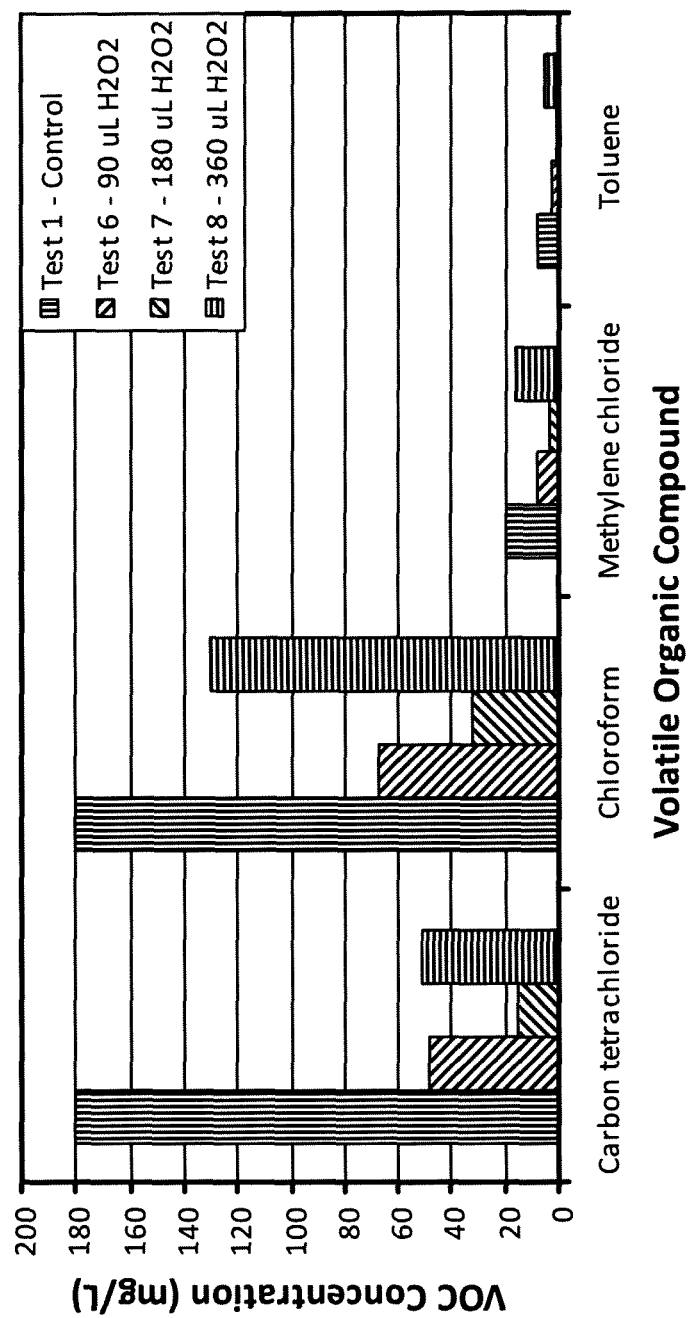
FIG. 4. shows initial VOC degradation tests.

VOC degradation in groundwater was performed utilizing $H_2O_2$, $MnO_2$ catalyst, and phosphate buffer. These tests were performed concurrently with Tests 1-5, thus Test 1 also represents a control for this series of tests. Three 40-mL unpreserved VOA vials were prepared. Each vial received 125 mg $MnO_2$ and 2.4 mL of 1.0 M phosphate buffer at pH 6.8. It is appreciated that the phosphate buffers may be prepared at any pH described herein, including near-neutral pHs of about 6.8, about 7, about 7.2, about 7.4, about 7.6, or about 7.8. The vials were then filled with groundwater, leaving sufficient volume for addition of hydrogen peroxide solution. Test 6 received 90 µL of 35.7% $H_2O_2$ solution, Test 7 received 180 µL of 35.7% $H_2O_2$ solution, and Test 8 received 360 µL of 35.7% $H_2O_2$ solution. The vials were lightly sealed (to permit oxygen release from peroxide degradation) and allowed to react for three days. The samples were then analyzed for carbon tetrachloride, chloroform, methylene chloride, chloromethane, and toluene via Method 624. The results are provided in FIG. 4 (chloromethane was not detected and thus not shown) and tabulated in Table 2.

All VOCs detected in the samples that received the peroxide exhibited degradation. The chloromethane concentrations were reduced by 45-86% relative to the control. Toluene was degraded by 38-86% relative to the control. Degradation of both the chloromethanes and toluene indicate formation of both superoxide and hydroxyl radical in this system. The greatest extent of degradation was observed in Test 7, although Test 8 received a greater dosage of peroxide. This was interpreted to be due to sample heterogeneity, particularly in light of the results of subsequent tests described below.

Example 9

Reaction with Chelated Manganese

Figure 5:
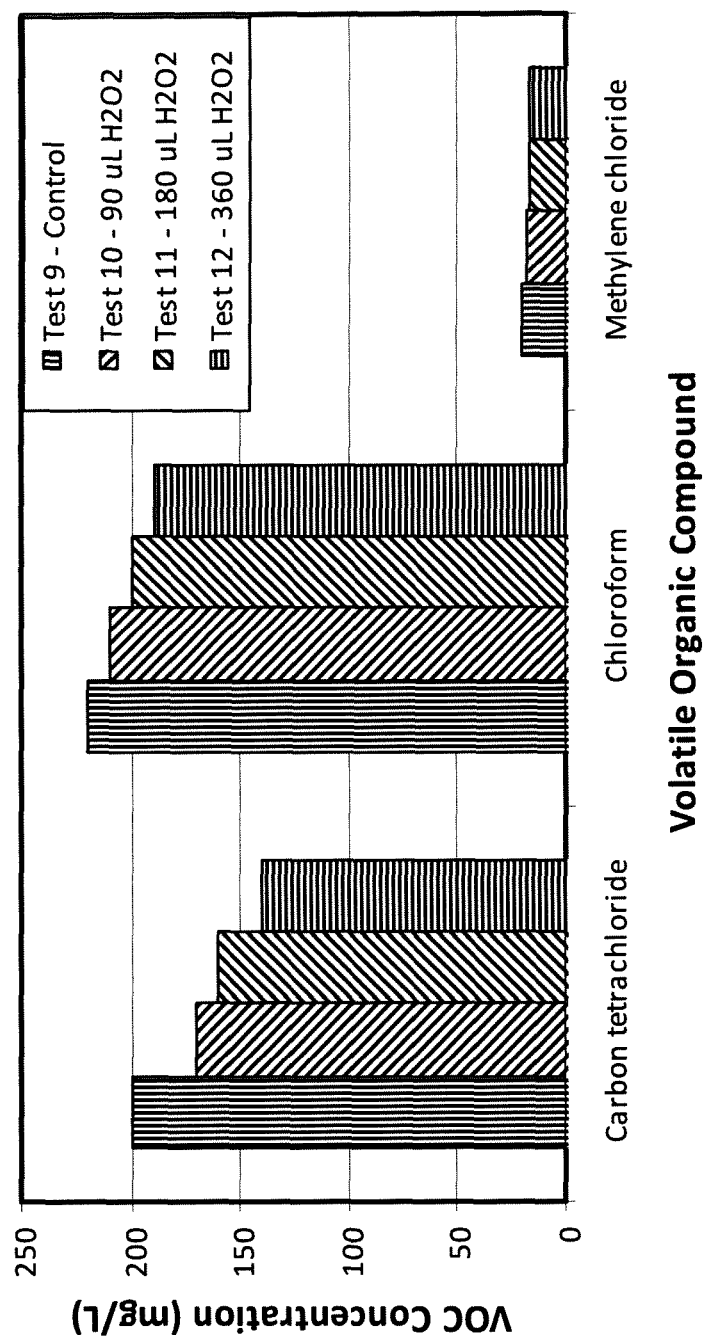
FIG. 5. shows VOC degradation with unbuffered E-MN-6.

Chelated manganese was evaluated as a source of manganese catalyst. Experiments were performed using Dissolvine E-MN-6 (ethylenediaminetetraacetic acid manganese-dipotassium complex). The E-MN-6 was selected because it is commercially available and also has a circumneutral pH (pH approximately 7 for a 1% solution). Tests were performed with and without phosphate buffer; tests with phosphate buffer are described in Example—Influence of Phosphate with Chelated Manganese. Four 40-mL unpreserved VOA vials were prepared. Each vial received 950 µL of E-MN-6. The vials were then filled with groundwater, leaving sufficient volume for addition of hydrogen peroxide solution. Test 9 is a control, and received the E-MN-6 but no peroxide. Test 10 received 90 µL of 35.7% $H_2O_2$ solution, Test 11 received 180 µL of 35.7% $H_2O_2$ solution, and Test 12 received 360 µL of 35.7% $H_2O_2$ solution. The vials were lightly sealed (to permit oxygen release from peroxide degradation) and allowed to react overnight. The samples were then analyzed for carbon tetrachloride, chloroform, methylene chloride, and chloromethane via Method 624. The results are provided in FIG. 5 (chloromethane was not detected and thus not shown) and tabulated in Table 2.

The VOCs exhibit degradation that is proportional to the peroxide dosage, with overall degradation of the VOCs ranging from 9-20%. Although degradation occurred, the extent of degradation is lower (with the same peroxide dosage) than observed in Tests 6-8 with $MnO_2$ catalyst and phosphate buffer.

Example 10

Influence of Phosphate with Chelated Manganese

Figure 6:
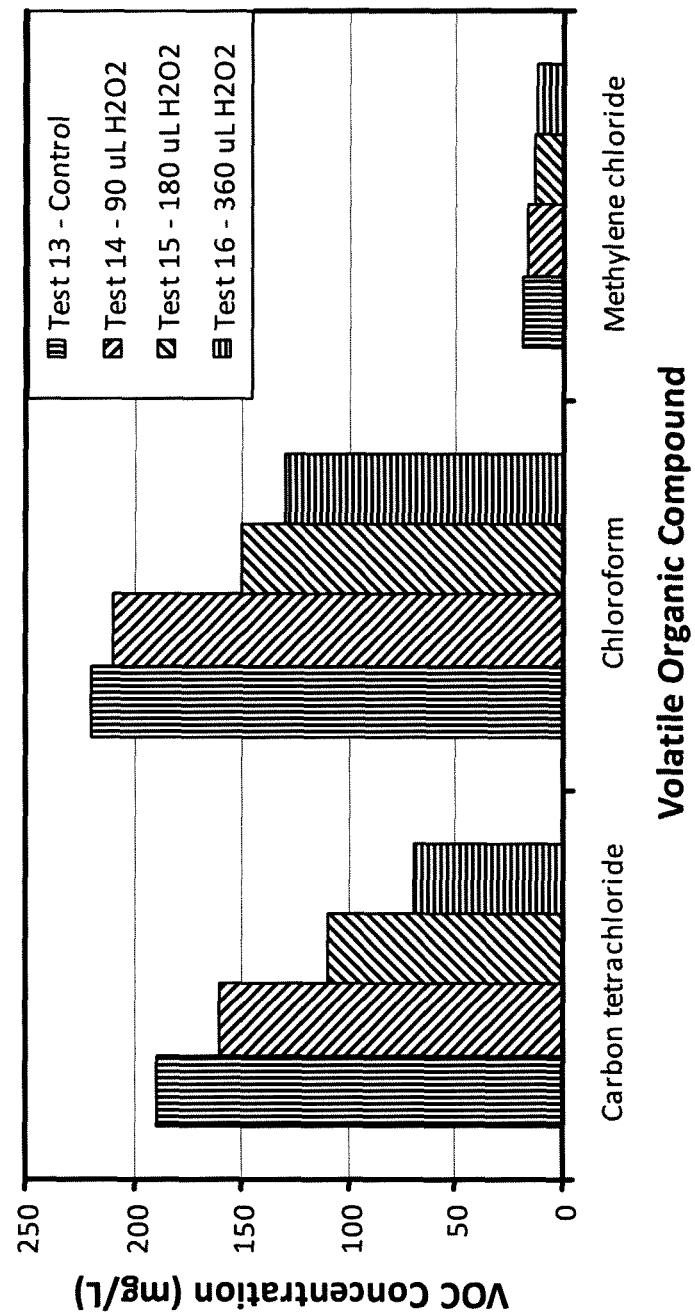
FIG. 6. shows VOC degradation with buffered E-MN-6.

The experiments with Mn-EDTA (Example—Reaction with Chelated Manganese) were repeated with a phosphate buffer, to evaluate if phosphate and/or pH buffering improved the degradation efficiency. Four 40-mL unpreserved VOA vials were prepared. Each vial received 950 µL of E-MN-6 and 2.4 mL of 1.0 M phosphate buffer at pH 6.8. It is appreciated that the phosphate buffers may be prepared at any pH described herein, including near-neutral pHs of about 6.8, about 7, about 7.2, about 7.4, about 7.6, or about 7.8. The vials were then filled with groundwater, leaving sufficient volume for addition of hydrogen peroxide solution. Test 13 is a control and received no peroxide. Test 14 received 90 µL of 35.7% $H_2O_2$ solution, Test 15 received 180 µL of 35.7% $H_2O_2$ solution, and Test 16 received 360 µL of 35.7% $H_2O_2$ solution. The vials were lightly sealed (to permit oxygen release from peroxide degradation) and allowed to react overnight. The samples were then analyzed for carbon tetrachloride, chloroform, methylene chloride, and chloromethane via Method 624. The results are provided in FIG. 6 (chloromethane was not detected and thus not shown) and tabulated in Table 2.

The VOCs exhibit degradation that is proportional to the peroxide dosage, with overall degradation of the VOCs ranging from 11-50%. The VOC degradation was improved relative to unbuffered Mn-EDTA, although the extent of degradation is lower (with the same peroxide dosage) than observed in Tests 6-8 with $MnO_2$ catalyst and phosphate buffer. Based upon the results with both unbuffered and buffered Mn-EDTA relative to the buffered $MnO_2$ tests, further testing with soil and DNAPL was performed with buffered $MnO_2$.

Example 11

Treatment of DNAPL-Impacted Soil

Five reactors were prepared. Each reactor was loaded with 500 g of homogenized, contaminated soil, 1,500 mL of groundwater, 20 g of $MnO_2$, and 200 mL of 1.0 M phosphate buffer at pH 6.8. It is appreciated that the phosphate buffers may be prepared at any pH described herein, including near-neutral pHs of about 6.8, about 7, about 7.2, about 7.4, about 7.6, or about 7.8. Test 17 was utilized as a control and received no peroxide. Test 18 received 50 mL of 35.7% $H_2O_2$, Test 19 received 150 mL of 35.7% $H_2O_2$, Test 20 received 300 mL of 35.7% $H_2O_2$, and Test 21 received 600 mL of 35.7% $H_2O_2$. The peroxide was added in 10-30 mL aliquots over a period of three days. The reactors were allowed to digest for one additional day before analytical samples were collected. Soil and groundwater were analyzed for VOCs via Method 624. Organochlorine pesticides in soil and groundwater were analyzed via EPA Method 608, and groundwater was analyzed for chloride via EPA Method 300.0.

Soil Results. The solid $MnO_2$ does not dissolve as part of the reactions occurring. Thus, the raw analytical results were corrected for mass dilution. The correction was made as follows:

$$\text{Total Mass (g)} = \text{Soil Mass (g)} + \text{MnO}_2 \text{ Mass (g)} \quad (a)$$

$$\text{Mass Dilution Factor (dimensionless)} = \text{Total Mass (g)}/\text{Soil Mass (g)} \quad (b)$$

$$\text{Corrected Concentration} = \text{Measured Concentration} \times \text{Mass Dilution Factor} \quad (c)$$

All of the sample masses and $MnO_2$ masses were the same (Example—Treatment of DNAPL-Impacted Soil). The corresponding Mass Dilution Factor is 1.04 for all of the soil results. The corrected soil data are presented in Table 4 and summarized in FIG. 7. Compounds present included carbon disulfide (a natural degradation product of carbon tetrachloride), chlorobenzene, ethylbenzene, methoxychlor, and methoxybenzene (a tentatively-identified compound). Although methoxybenzene (also known as anisole) is tentatively identified and its concentrations are estimated, without being bound by theory, the structure of this compound suggests it is a degradation product of methoxychlor.

TABLE 3

Analytical results for tests 17-21 (uncorrected data).

| Analytical Data | Test 17 Water | Test 17 Soil | Test 18 Water | Test 18 Soil | Test 19 Water | Test 19 Soil |
|---|---|---|---|---|---|---|
| Chloride (mg/L) | 1,100 | NA | 780 | NA | 730 | NA |
| Methoxychlor | 1,100 | 610 | 6,300 | 210 | 170 | 110 |
| Methoxybenzene (TIC) | 220,000 | ND (no RL) | 35,000 | 24 | 13,000 | 17 |
| 2-Butanone | ND (<5,000) | ND (<1.6) | ND (<1,000) | ND (<1.5) | ND (<200) | ND (<1.2) |
| Acetone | ND (<25,000) | ND (<7.9) | ND (<5,000) | ND (<7.3) | ND (<1,000) | ND (<6.0) |
| Carbon disulfide | 48,000 | 3.5 | ND (<1,000) | 9.1 | ND (<200) | 4.9 |
| Carbon tetrachloride | 220,000 | 2.8 | 6,300 | 95 | 1,900 | 26 |
| Chlorobenzene | 41,000 | 780 | 19,000 | 380 | 14,000 | 270 |
| Chloroform | 310,000 | 11 | 34,000 | 61 | 17,000 | 31 |
| cis-1,2-Dichloroethene | ND (<5,000) | ND (<1.6) | 1,200 | ND (<1.5) | ND (<200) | ND (<1.2) |
| Ethylbenzene | ND (<5,000) | 83 | ND (<1,000) | 34 | 450 | 23 |
| Methylene chloride | 16,000 | ND (<1.6) | 3,700 | 4.7 | 2,600 | 3.3 |
| t-Butyl alcohol | ND (<25,000) | ND (<7.9) | ND (<5,000) | ND (<7.3) | ND (<1,000) | ND (<6.0) |

| Analytical Data | Test 20 Water | Test 20 Soil | Test 21 Water | Test 21 Soil |
|---|---|---|---|---|
| Chloride (mg/L) | 630 | NA | 580 | NA |
| Methoxychlor | 240 | 42 | 170 | 110 |
| Methoxybenzene (TIC) | 6,400 | 13 | 320 | 6.7 |

TABLE 3-continued

Analytical results for tests 17-21 (uncorrected data).

| | | | | |
|---|---|---|---|---|
| 2-Butanone | ND (<100) | ND (<1.3) | 92 | ND (<1.3) |
| Acetone | ND (<500) | ND (<6.5) | 1,200 | ND (<6.3) |
| Carbon disulfide | ND (<100) | 3.8 | 18 | 5.1 |
| Carbon tetrachloride | 200 | 2.6 | 200 | ND (<1.3) |
| Chlorobenzene | 4,800 | 130 | 1,600 | 120 |
| Chloroform | 1,800 | 5.4 | 200 | 4.9 |
| cis-1,2-Dichloroethene | ND (<100) | ND (<1.3) | ND (<5.0) | ND (<1.3) |
| Ethylbenzene | 150 | 9.6 | 53 | 7.3 |
| Methylene chloride | 370 | ND (<1.3) | 24 | ND (<1.3) |
| t-Butyl alcohol | ND (<500) | ND (<6.5) | 64 | ND (<6.3) |

Notes:
ND: analyte not detected at the quoted reporting limit
NA: not analyzed
TIC: tentatively-identified compound; result is estimated

TABLE 4

Analytical results for tests 17-21 (data corrected for dilution).

| | Test 17 | | Test 18 | | Test 19 | |
|---|---|---|---|---|---|---|
| Analytical Data | Water | Soil | Water | Soil | Water | Soil |
| Chloride (mg/L) | 1,247 | — | 910 | — | 900 | — |
| Methoxychlor | 1,247 | 634 | 7,350 | 218 | 210 | 114 |
| Methoxybenzene (TIC) | 249,333 | — | 40,833 | 25 | 16,033 | 18 |
| 2-Butanone | — | — | — | — | — | — |
| Acetone | — | — | — | — | — | — |
| Carbon disulfide | 54,400 | 3.6 | — | 9.5 | — | 5.1 |
| Carbon tetrachloride | 249,333 | 2.9 | 7,350 | 99 | 2,343 | 27 |
| Chlorobenzene | 46,467 | 811 | 22,167 | 395 | 17,267 | 281 |
| Chloroform | 351,333 | 11 | 39,667 | 63 | 20,967 | 32 |
| cis-1,2-Dichloroethene | — | — | 1,400 | — | — | — |
| Ethylbenzene | — | 86 | — | 35 | 555 | 24 |
| Methylene chloride | 18,133 | — | 4,317 | 4.9 | 3,207 | 3.4 |
| t-Butyl alcohol | — | — | — | — | — | — |

| | Test 20 | | Test 21 | |
|---|---|---|---|---|
| Analytical Data | Water | Soil | Water | Soil |
| Chloride (mg/L) | 840 | — | 889 | — |
| Methoxychlor | 320 | 44 | 261 | 114 |
| Methoxybenzene (TIC) | 8,533 | 14 | 491 | 7.0 |
| 2-Butanone | — | — | 141 | — |
| Acetone | — | — | 1,840 | — |
| Carbon disulfide | — | 4.0 | 28 | 5.3 |
| Carbon tetrachloride | 267 | 2.7 | 307 | — |
| Chlorobenzene | 6,400 | 135 | 2,453 | 125 |
| Chloroform | 2,400 | 5.6 | 307 | 5.1 |
| cis-1,2-Dichloroethene | — | — | — | — |
| Ethylbenzene | 200 | 10 | 81 | 7.6 |
| Methylene chloride | 493 | — | 37 | — |
| t-Butyl alcohol | — | — | 98 | — |

Notes:
Data from Table 2-2 are corrected for dilution by factoring in the mass of solid $MnO_2$ (for soil) and the volume of liquids (for water) added to each reactor. See Section 2.3.4.

Figure 7:
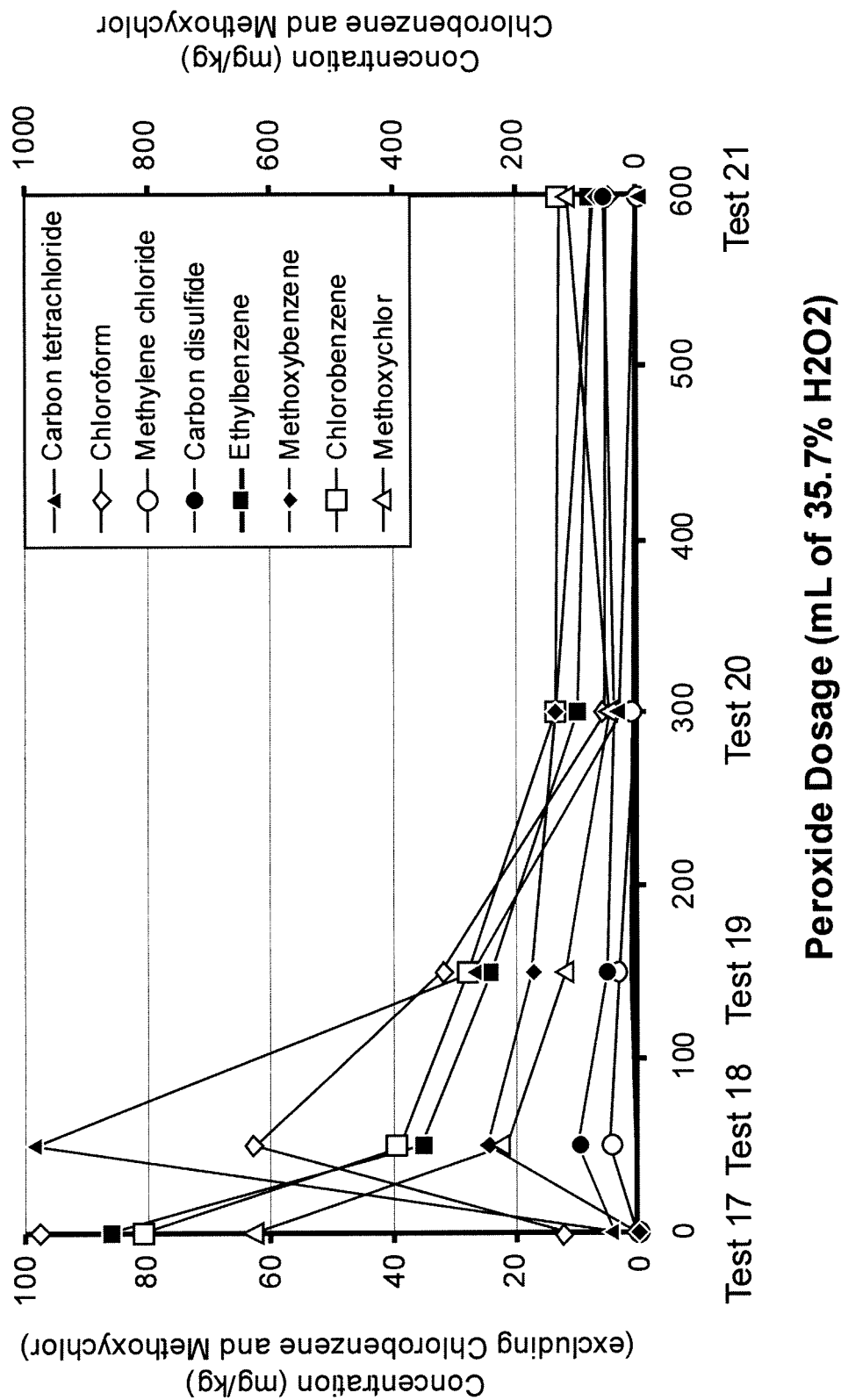
FIG. 7. shows soil analytical results (dilution-corrected data).

Comparison of the results for the control sample (Test 17) and the first peroxide dosage (Test 18) yields an unexpected pattern that is interpreted to reflect solubility of the contaminant compounds (FIG. 7). In the control soil sample (Test 17), the most concentrated compounds were methoxychlor (634 mg/kg), chlorobenzene (811 mg/kg), and ethylbenzene (86 mg/kg). The chloromethanes, carbon disulfide, and methoxybenzene were detected at relatively lower concentrations (non-detectable—11 mg/kg). In the first sample treated with peroxide (Test 18), the concentrations of methoxychlor, chlorobenzene, and ethylbenzene yield the expected reductions relative to their concentrations in the control soil sample. In contrast, the concentrations of the chloromethanes, carbon disulfide, and methoxybenzene in soil are unexpectedly higher relative to their concentration in the control sample. One hypothesis to explain this pattern is that the differences reflect sample heterogeneity. However, the difference is interpreted to more likely reflect solubility. Solubility of the chloromethanes, carbon disulfide, and methoxybenzene ranges from 0.2-8 g/L, while in contrast the solubility of ethylbenzene, chlorobenzene, and methoxychlor is less than 0.05 g/L. As will be discussed in Example—Groundwater Results and Example—Contaminant Mass Balance, the groundwater concentrations and overall contaminant mass decrease consistently with peroxide dosage; thus peroxide may have an initial effect of decreasing solubility of the chloromethanes, carbon disulfide, and methoxychlor.

All of the detected contaminant compounds are degraded relative to their maximum concentrations in Test 17 or Test 18. As with the previous tests utilizing groundwater only (Tests 6-8), both the chloromethanes (reactive to superoxide radical but unreactive to hydroxyl radical) and aromatics (reactive to hydroxyl radical but unreactive to superoxide radical) were degraded, indicating formation of both superoxide radicals and hydroxyl radicals in the system. At neutral pH, $MnO_2$ catalyzes peroxide only to superoxide radicals and not to hydroxyl radicals (Watts et al., 2005; Watts, 2006); thus naturally occurring iron or other transition metals in the soil and groundwater are likely catalyzing peroxide to yield hydroxyl radicals.

The contaminant compound destruction exhibits an asymptotic pattern. The greatest extent of degradation occurs between Tests 18 through 20. From Test 20 to Test 21, over which the peroxide dosage was doubled, the soil contaminant compound concentrations exhibit little further reduction; soil concentrations of methoxychlor and carbon disulfide increase slightly in Test 21 relative to Test 20. Overall contaminant compound concentrations (between the maximum and minimum concentrations observed) decreased by an average of 86%, with a range from 58% for carbon disulfide to a nominal 100% for methylene chloride and carbon tetrachloride.

Example 12

Groundwater Results

The groundwater analytical results are presented on Table 3. The volume of liquid reagents added to each test was different, thus for accurate comparison and evaluation the results were corrected for dilution by factoring the volume of liquid reagents added to each reactor. The correction was made as follows:

Total Volume (mL)=Groundwater Volume (mL)+
Buffer Volume (mL)+Peroxide Volume (mL)   (a)

Volume Dilution Factor (dimensionless)=Total Volume (mL)/Groundwater Volume (mL)   (b)

Corrected Concentration (µg/L)=Measured Concentration (µg/L)×Volume Dilution Factor   (c)

Figure 8:
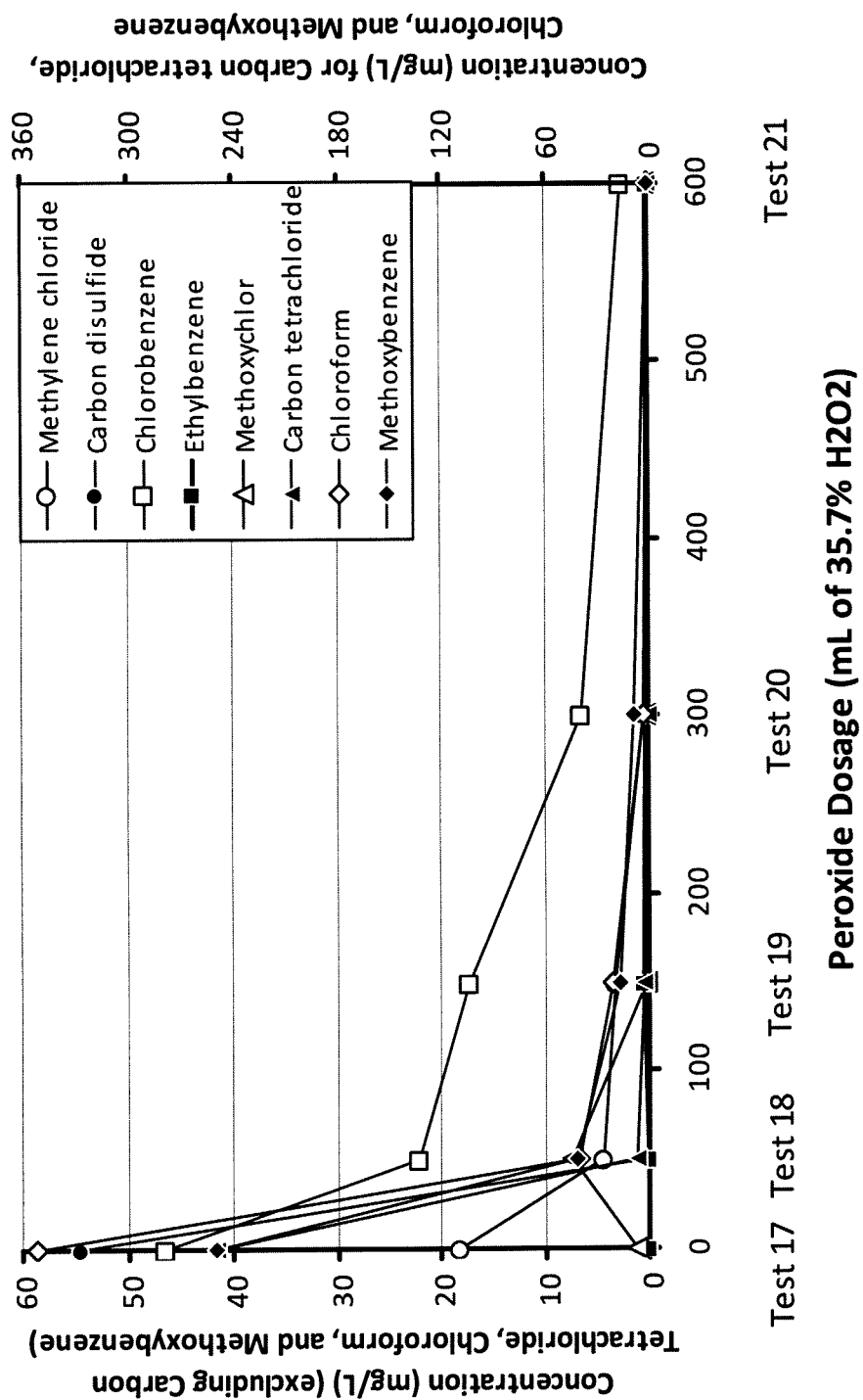
FIG. 8. shows groundwater analytical results (dilution-corrected data); (a) Concentration (mg/L) (excluding Carbon Tetrachloride, Chloroform, and Methoxybenzene); (b) Concentration (mg/L) for Carbon tetrachloride, Chloroform, and Methoxybenzene.

The corresponding Volume Dilution Factors range from 1.13 (Test 17) to 1.53 (Test 21). The corrected water data are presented on Table 4 and summarized in FIG. 8, and are discussed herein.

Additional compounds were detected in the water samples that were not detected in soil. Acetone, 2-butanone (methyl ethyl ketone), and tert-butyl alcohol were detected in Test 21, which received the highest peroxide dosage; all are oxidation products from hydrogen peroxide degradation of natural organic matter in soil and thus not considered contaminant compounds. Cis-1,2-dichloroethene was detected in Test 18 groundwater at a dilution-corrected concentration of 1,400 µg/L; this compound was not detected in any other soil or groundwater sample, and thus not considered a contaminant compound.

The concentrations of all compounds except methoxychlor and ethylbenzene exhibit the expected pattern of decreasing concentration with increasing peroxide dosage. The concentration of methoxychlor increased in the first peroxide dosage (Test 18) relative to the control (Test 17), likely reflecting desorption as discussed in Example—Soil Results. Carbon disulfide decreased from 54.4 mg/L to non-detectable in the first peroxide dosage (Test 18), remained non-detectable in Tests 19-20, and was then detected at 28 µg/L in Test 21. As with the soil results (FIG. 7), contaminant compound degradation is asymptotic, with relatively less additional degradation occurring with a doubling of the peroxide dosage between Tests 20 and 21. Overall contaminant compound concentrations (between the maximum and minimum concentrations observed) decreased by an average of 98%, with a range from 89% for ethylbenzene to a nominal 100% for carbon tetrachloride, chloroform, methylene chloride, carbon disulfide, and methoxybenzene.

Example 13

Figure 9:
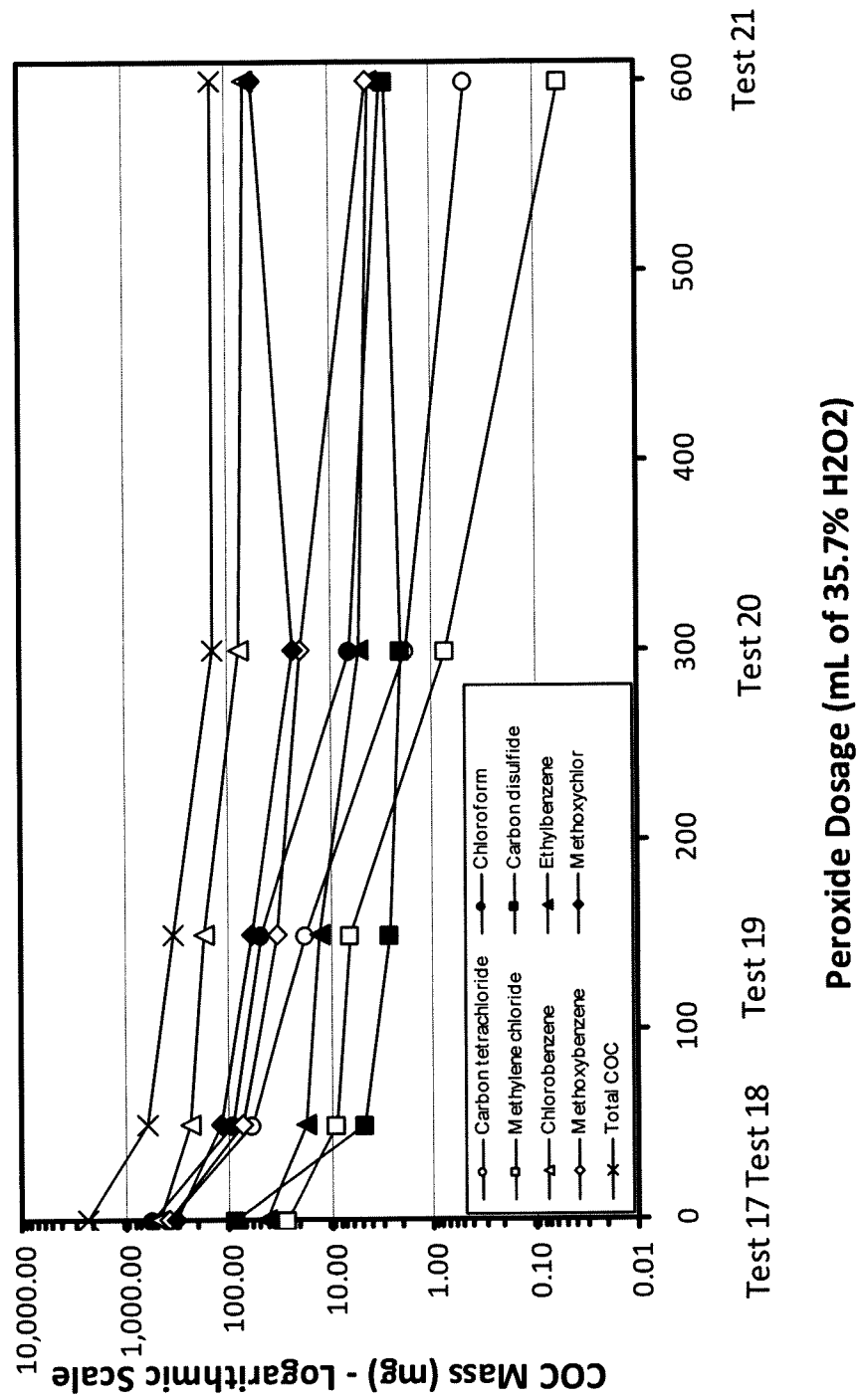
FIG. 9. shows contaminant compound mass results; the concentration data are converted to contaminant mass in milligrams, and shown as a function of peroxide amount.

The concentration data were converted to contaminant mass in milligrams, and charted as a function of peroxide dosage as shown in FIG. 9. The following observations were made:

(a) Carbon tetrachloride, chloroform, and methylene chloride are known to degrade by reduction from superoxide, and not from oxidation by hydroxyl radical. All three compounds show consistent degradation with higher peroxide dosage. However, most (83%) of the total mass of these compounds (total of carbon tetrachloride, chloroform, and methylene chloride) is destroyed with the first peroxide dosage. Overall destruction for these compounds is nearly 100%.

(b) Carbon disulfide reacts with both superoxide and with hydroxyl radical. Results for carbon disulfide also show an initial large decrease in contaminant mass with the first peroxide dosage. Overall destruction is about 97%.

(c) Chlorobenzene and ethylbenzene react only with the hydroxyl radical, and do not react with superoxide. Approximately 60% of the chlorobenzene and ethylbenzene degraded with the first peroxide dose with overall destruction is about 87%.

(d) Methoxychlor reacts rapidly with hydroxyl radical, but published data regarding reaction of methoxychlor with superoxide have not been identified. Regardless of the precise mechanism, the results demonstrate that the methods of the invention result in degradation of methoxychlor. Overall methoxychlor degradation was 82%.

Overall, the destruction of the chlorobenzene and ethylbenzene relative to the destruction efficiency of carbon tetrachloride, chloroform and methylene chloride, indicates that both the superoxide and hydroxyl radicals are produced at all peroxide concentrations tested. Further, but without being bound by theory, it is believed that at lower peroxide concentrations the superoxide and hydroxyl radicals are both produced, and probably at similar relative rates. In contrast, at higher peroxide concentrations, the production of superoxide appears to become more efficient than for hydroxyl radical.

All compounds were destroyed in both the soil-sorbed and dissolved phase. A NAPL was physically observed in the samples prior to peroxide addition, but disappeared with treatment.

It has been reported that degradation of peroxide results in the concomitant formation of gases, such as oxygen, that pass through the soil and water and entrain volatiles, which are then vented. However, without being bound by theory, it is believed herein that little of the decrease in VOCs observed in the Examples described herein is due to volatilization. Several experiments were performed, but in the absence of a control, to determine the maximum amount of VOCs lost during performance of various processes described herein by installing VOST tubes on the top of the reactors, so that off-gases pass through the absorbant media and the VOCs are trapped. The range of VOCs lost was found to be about 6-13%. However, it is known that VOCs are lost over time in the absence of performance of any process, i.e. a control. Therefore, it is appreciated that the normalized loss observed in the above experiments is lower.

It has been reported that reductive dechlorination (carbon tetrachloride to chloroform to methylene chloride to chloromethane, to methane) is one mechanism of decomposition observed during remediation of such contaminants. However, without being bound by theory, it is believed herein that such a reductive dechlorination is not the pathway for the superoxide, because chloromethane was not observed in the water or soil, and the degradation of chloroform and methylene chloride proceeded at efficiencies similar to the carbon tetrachloride. Though chloromethane was detected in the VOST tubes, the amount was at insignificant concentrations relative to the other compounds. Without being bound by theory, it is believed that other mechanisms of decontamination are also operating, including reduction to carbon monoxide, which subsequently oxidizes spontaneously to carbon dioxide; reduction to formate and then to carbon dioxide; and reduction to carbon dioxide, with carbon disulfide as an intermediate.

Example 14

Analysis for Phosgene

It has been reported that degradation of carbon tetrachloride by superoxide may produce phosgene as a potential intermediate product (see Smith et al., 2004, 2006; and Watts, 2006 in prior art discussion). Phosgene is a gas that could pose a health and safety issue, and has an exposure limit of 0.1 parts per million (ppm) established by OSHA. An experiment was conducted to determine if phosgene is produced in measurable or potentially hazardous concentrations. A reactor with a 4,000-mL volume was prepared with 500 g of contaminated soil, 1,000 mL of contaminated groundwater, 20 g of $MnO_2$ precipitated from sodium permanganate, and 200 mL of 1.0 M phosphate buffer at pH=6.8. It is appreciated that the phosphate buffers may be prepared at any pH described herein, including near-neutral pHs of about 6.8, about 7, about 7.2, about 7.4, about 7.6, or about 7.8. The reactor contained approximately 2 L of headspace for accumulation of gas-phase reaction products. A total of 220 mL of 37.5% $H_2O_2$ was added in aliquots ranging from 30 mL to 100 mL volume over a 55-minute period. The off-gas produced inside the reactor was periodically analyzed for phosgene during the peroxide additions and for 1.25 hours following the peroxide addition. Phosgene was not detected, with a method detection limit of 0.02 ppm.

Example 15

Contaminant Compound Mass Balance

The overall objective for application of this technology is to reduce contaminant compound mass, thus an important design requirement is to assess the contaminant compound mass destroyed amount as a function of peroxide mass added. A mass balance was calculated based upon the measured results, adjusted for the masses or volumes of reagents and samples utilized. For the aqueous phase, the total contaminant compound mass was calculated by multiplying the measured concentration (Table 3) by the total volume of groundwater and all liquid reagents added. For the soil phase, the total contaminant compound mass was calculated by multiplying the measured concentration (Table 3) by the total mass of soil and $MnO_2$ catalyst. The total contaminant compound masses for each analyte, in each reactor, are provided in Table 5. The results for each contaminant compound are presented graphically in FIG. 9. The total contaminant compound mass (sum of all contaminant compounds) is also shown. The contaminant compounds shown in FIG. 9 exclude acetone, 2-butanone, tert-butyl alcohol, and cis-1,2-dichloroethene (which were each detected in only one sample), and chloride (which is a non-hazardous oxidation product and therefore not a contaminant compound).

Figure 10:
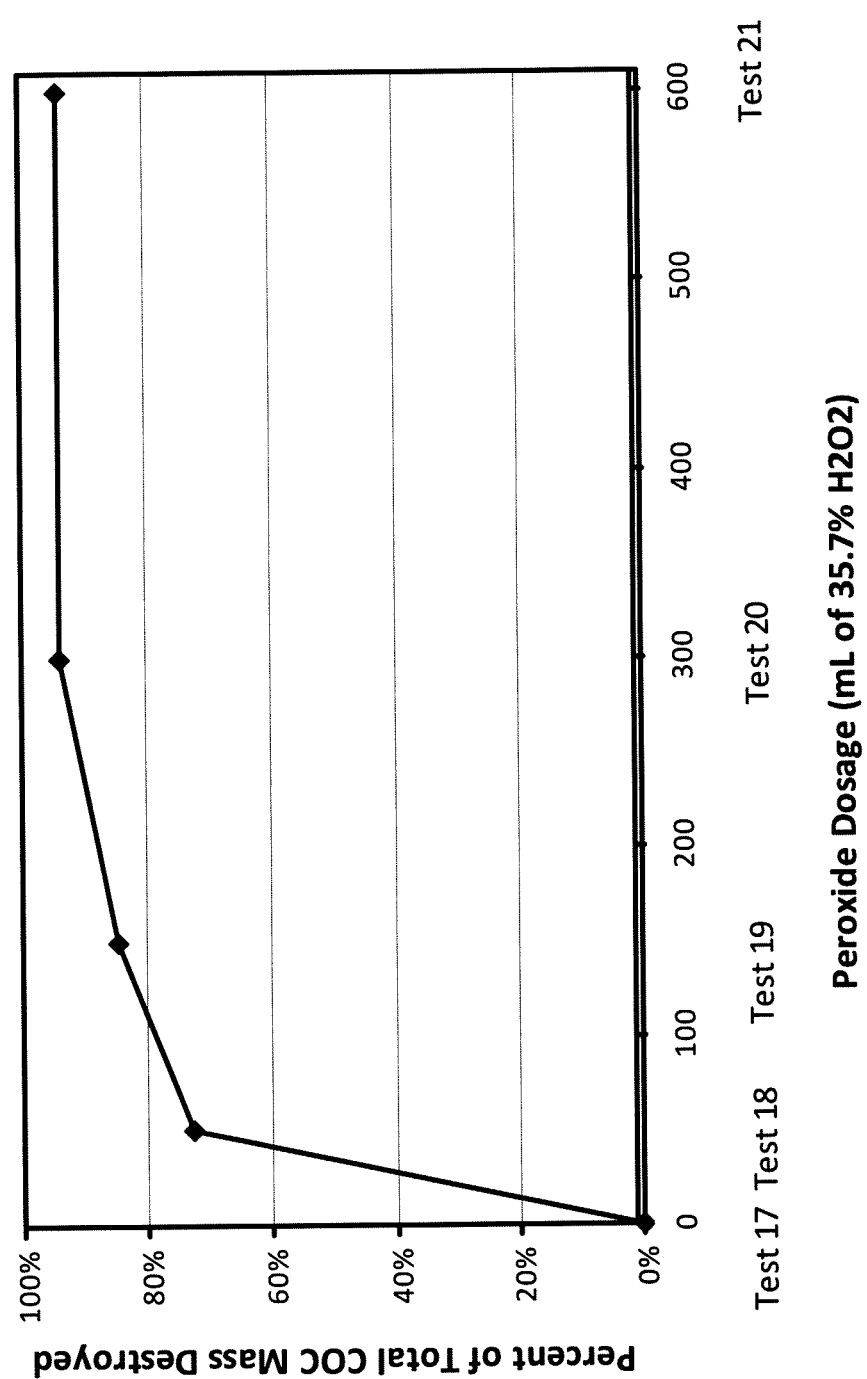
FIG. 10. shows percent contaminant compound mass destroyed.

Mass destruction by analyte ranges from 86% for chlorobenzene, to a nominal 100% for carbon tetrachloride and methylene chloride. The overall contaminant compound mass was reduced by 94%. Carbon tetrachloride, methylene chloride, and methoxybenzene exhibit relatively continuous degradation as a function of peroxide mass, with continued contaminant compound mass reduction between Test 20 and Test 21. In contrast, the other contaminant compounds and the total contaminant compound mass exhibit the most significant destruction between Tests 17 (control) and Test 19 or 20, and asymptotic behavior at higher peroxide dosages (FIG. 10). Thus although reductions continue for certain compounds, with respect to overall contaminant mass there is little additional destruction beyond a dosage of 300 mL of peroxide solution (Test 20).

TABLE 5

Contaminant compound mass balance.

| Analytical Data | Test 17 | | Test 18 | | Test 19 | |
|---|---|---|---|---|---|---|
| | Water | Soil | Water | Soil | Water | Soil |
| Chloride | 1,870 | — | 1,365 | — | 1,351 | — |
| Methoxychlor | 1.9 | 317 | 11 | 109 | 0.3 | 57 |
| Methoxybenzene (TIC) | 374 | — | 61 | 12 | 24 | 8.8 |
| 2-Butanone | — | — | — | — | — | — |
| Acetone | — | — | — | — | — | — |
| Carbon disulfide | 82 | 1.8 | — | 4.7 | — | 2.5 |
| Carbon tetrachloride | 374 | 1.5 | 11 | 49 | 3.5 | 14 |
| Chlorobenzene | 70 | 406 | 33 | 198 | 26 | 140 |
| Chloroform | 527 | 5.7 | 60 | 32 | 31 | 16 |
| cis-1,2-Dichloroethene | — | — | 2.1 | — | — | — |
| Ethylbenzene | — | 43 | — | 18 | 0.8 | 12 |
| Methylene chloride | 27 | — | 6.5 | 2.4 | 4.8 | 1.7 |
| t-Butyl alcohol | — | — | — | — | — | — |

| Analytical Data | Test 20 | | Test 21 | |
|---|---|---|---|---|
| | Water | Soil | Water | Soil |
| Chloride | 1,260 | — | 1,334 | — |
| Methoxychlor | 0.5 | 22 | 0.4 | 55 |
| Methoxybenzene (TIC) | 13 | 6.8 | 0.7 | 3.5 |
| 2-Butanone | — | — | 0.2 | — |
| Acetone | — | — | 2.8 | — |
| Carbon disulfide | — | 2.0 | 0.0 | 2.7 |
| Carbon tetrachloride | 0.4 | 1.4 | 0.5 | — |
| Chlorobenzene | 10 | 68 | 3.7 | 62 |
| Chloroform | 3.6 | 2.8 | 0.5 | 2.5 |
| cis-1,2-Dichloroethene | — | — | — | — |
| Ethylbenzene | 0.3 | 5.0 | 0.1 | 3.8 |
| Methylene chloride | 0.7 | — | 0.1 | — |
| t-Butyl alcohol | — | — | 0.1 | — |

What is claimed is:

1. A process for remediation of a site having one or more soil contaminants, one or more groundwater contaminants, or a combination thereof, the process comprising the steps of contacting the site with (a) Mn(IV) or a composition capable of generating Mn(IV), and generating Mn(IV); (b) a buffered aqueous solution having a pH in the range from about 6 to about 10; and (c) a peroxide or a compound capable of forming a peroxide.

2. The process of claim 1 wherein the pH is in the range from about 6.5 to about 8.

3. The process of claim 1 wherein the buffered aqueous solution further comprises one or more compounds capable of forming a ligand with manganese.

4. The process of claim 1 wherein the buffered aqueous solution comprises one or more phosphate salts.

5. The process of claim 1 wherein the compound capable of generating Mn(IV) comprises a permanganate compound.

6. The process of claim 1 wherein the Mn(IV) is in the form of a $MnO_2$ precipitate.

7. The process of claim 1 wherein the peroxide or the compound capable of forming the peroxide comprises hydrogen peroxide.

8. The process of claim 1 wherein the peroxide or the compound capable of forming the peroxide comprises calcium peroxide, magnesium peroxide, sodium percarbonate, or a combination thereof.

9. The process of claim 1 wherein the contaminants comprise a compound capable of reacting with a reducing agent but not an oxidizing agent.

10. The process of claim 1 wherein the contaminants comprise a highly oxidized carbon compound.

11. The process of claim 1 wherein the contaminants comprise a compound capable of reacting with a reductive radical compound.

12. The process of claim 11 wherein the reductive radical compound is superoxide.

13. The process of claim 1 wherein the contaminants comprise one or more chloromethanes, nitroaromatics, or a combination thereof.

14. The process of claim 1 wherein the contaminants comprise one or more components selected from the group consisting of carbon tetrachloride, chloroform, methylene chloride, acetone, freons, nitrobenzenes, hexavalent chromium, and cyanide.

15. The process of claim 1 wherein the contaminants comprise a compound oxidizable by the compound capable of generating Mn(IV).

16. The process of claim 1 wherein the contaminants comprise one or more components selected from the group consisting of tetrachloroethene, trichloroethene, dichloroethylene, vinyl chloride, ethylene dibromide, polychlorinated biphenyls, and naphthalene.

17. The process of claim 1 wherein the contaminants comprise one or more compounds selected from the group consisting of benzene, toluene, xylene, ethylbenzene, chlorobenzene, naphthalene, trinitrotoluene, benzo(a)pyrene, anilines, chlorophenols, methyl tert-butyl ether, tert-butyl alcohol, alkenes, alkanes, perchloroethylene, trichloroethylene, 1,1,1-trichloroethane, 1,1,2-trichloroethane, carbon disulfide, quinones, hydroquinones, formate, and organic acids.

18. The process of claim 1 wherein the contaminants comprise a pesticide.

19. The process of claim 1 wherein steps (b) and (c) are performed contemporaneously or simultaneously.

20. A process for remediation of a site having one or more soil contaminants, one or more groundwater contaminants, or a combination thereof, the process comprising the steps of contacting the site with (a) Mn(IV) or a compound capable of generating Mn(IV), and generating Mn(IV); (b) one or more compounds capable of forming a ligand with a manganese ion; and (c) a peroxide or a compound capable of forming a peroxide.

21. The process of claim 20 wherein the one or more compounds capable of forming a ligand with the manganese ion are included in a buffered aqueous solution having a pH in the range from about 6 to about 10.

22. The process of claim 21 wherein the pH is in the range from about 6.5 to about 8.

* * * * *